(12) United States Patent
Brueckner et al.

(10) Patent No.: US 10,362,202 B2
(45) Date of Patent: Jul. 23, 2019

(54) DEVICE AND METHOD FOR RELATIVE POSITIONING OF MULTI-APERTURE OPTICS COMPRISING SEVERAL OPTICAL CHANNELS IN RELATION TO AN IMAGE SENSOR

(71) Applicant: Fraunhofer-Gesellschaft zur Foerderung der angewandten Forschung e.V., Munich (DE)

(72) Inventors: Andreas Brueckner, Jena (DE); Frank Wippermann, Meiningen (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 83 days.

(21) Appl. No.: 15/389,970

(22) Filed: Dec. 23, 2016

(65) Prior Publication Data

US 2017/0111558 A1    Apr. 20, 2017

Related U.S. Application Data

(63) Continuation of application No. PCT/EP2015/064284, filed on Jun. 24, 2015.

(30) Foreign Application Priority Data

Jun. 24, 2014   (DE) ........................ 10 2014 212 104

(51) Int. Cl.
*H04N 5/225*    (2006.01)
*H04N 17/00*    (2006.01)
*G06T 7/80*    (2017.01)

(52) U.S. Cl.
CPC ............. *H04N 5/2254* (2013.01); *G06T 7/80* (2017.01); *H04N 5/2253* (2013.01); *H04N 17/002* (2013.01); *G06T 2207/30204* (2013.01)

(58) Field of Classification Search
CPC .................................................... H04N 5/2254
(Continued)

(56) References Cited

U.S. PATENT DOCUMENTS

2003/0123045 A1    7/2003    Riegl et al.
2006/0001861 A1    1/2006    Wegmann et al.
(Continued)

FOREIGN PATENT DOCUMENTS

AT    412032 B    8/2004
CN    101959457 A    1/2011
(Continued)

OTHER PUBLICATIONS

Aei Boston, "Camera Alignment—CMAT Modular Assembly System", Retrieved from: www.aeiboston.com/platform_cmat.htm, May 2014, 1 page.
(Continued)

*Primary Examiner* — Joel W Fosselman
(74) *Attorney, Agent, or Firm* — Perkins Coie LLP; Michael A. Glenn

(57) ABSTRACT

A device for relative positioning of multi-aperture optics having several optical channels in relation to an image sensor includes a reference object, a positioning device, and a calculating device. The reference object is arranged such that the reference object is imaged onto one image region per channel in the optical channels by the multi-aperture optics. The positioning device is controllable to change a relative location between the multi-aperture optics and the image sensor. The calculating device is configured to determine actual positions of the reference object in at least three image regions in images of the reference object and to control the positioning device on the basis of a comparison of the actual positions with positions.

12 Claims, 21 Drawing Sheets

(58) Field of Classification Search
USPC .......................................................... 348/340
See application file for complete search history.

(56) References Cited

U.S. PATENT DOCUMENTS

| | | | |
|---|---|---|---|
| 2007/0002159 A1* | 1/2007 | Olsen | G02B 7/04 348/335 |
| 2009/0160997 A1* | 6/2009 | Oyama | H04N 5/2254 348/340 |
| 2010/0194901 A1 | 8/2010 | van Hoorebeke et al. | |
| 2011/0001814 A1 | 1/2011 | Yamanaka et al. | |
| 2011/0228142 A1 | 9/2011 | Brueckner et al. | |
| 2011/0298968 A1 | 12/2011 | Tseng et al. | |
| 2012/0013749 A1 | 1/2012 | Oberdoerster et al. | |
| 2012/0026093 A1 | 2/2012 | Duparre et al. | |
| 2013/0003199 A1 | 1/2013 | Jeong et al. | |
| 2013/0047396 A1 | 2/2013 | Au et al. | |
| 2014/0043469 A1 | 2/2014 | Engel et al. | |

FOREIGN PATENT DOCUMENTS

| | | |
|---|---|---|
| DE | 4141226 A1 | 6/1993 |
| DE | 10139596 A1 | 3/2003 |
| DE | 102009005092 A1 | 9/2010 |
| EP | 2736262 A2 | 5/2014 |
| JP | 2007269879 A | 10/2007 |
| JP | 2009092876 A | 4/2009 |
| JP | 2009238205 A | 10/2009 |
| JP | 2011133509 A | 7/2011 |
| JP | 2012049999 A | 3/2012 |
| JP | 2013120295 A | 6/2013 |
| JP | 2014060621 A | 4/2014 |
| WO | 2004057423 A1 | 7/2004 |
| WO | 2011045324 A2 | 4/2011 |
| WO | 2014023344 A1 | 2/2014 |

OTHER PUBLICATIONS

Gale, M. et al., "Active alignment of replicated microlens arrays on a charge-coupled device imager", Optical Engineering, 36 (5), May 1997, pp. 1510-1517.

Kasalis, "pixidTM—Advanced Camera Module Manufacturing Systems", www.kasalis.com/downloads/Kasalis Pixid Brochure.pdf, 2013, 8 pages.

* cited by examiner

| Fig. 8 | |
|---|---|
| Fig. 8a | Fig. 8b |

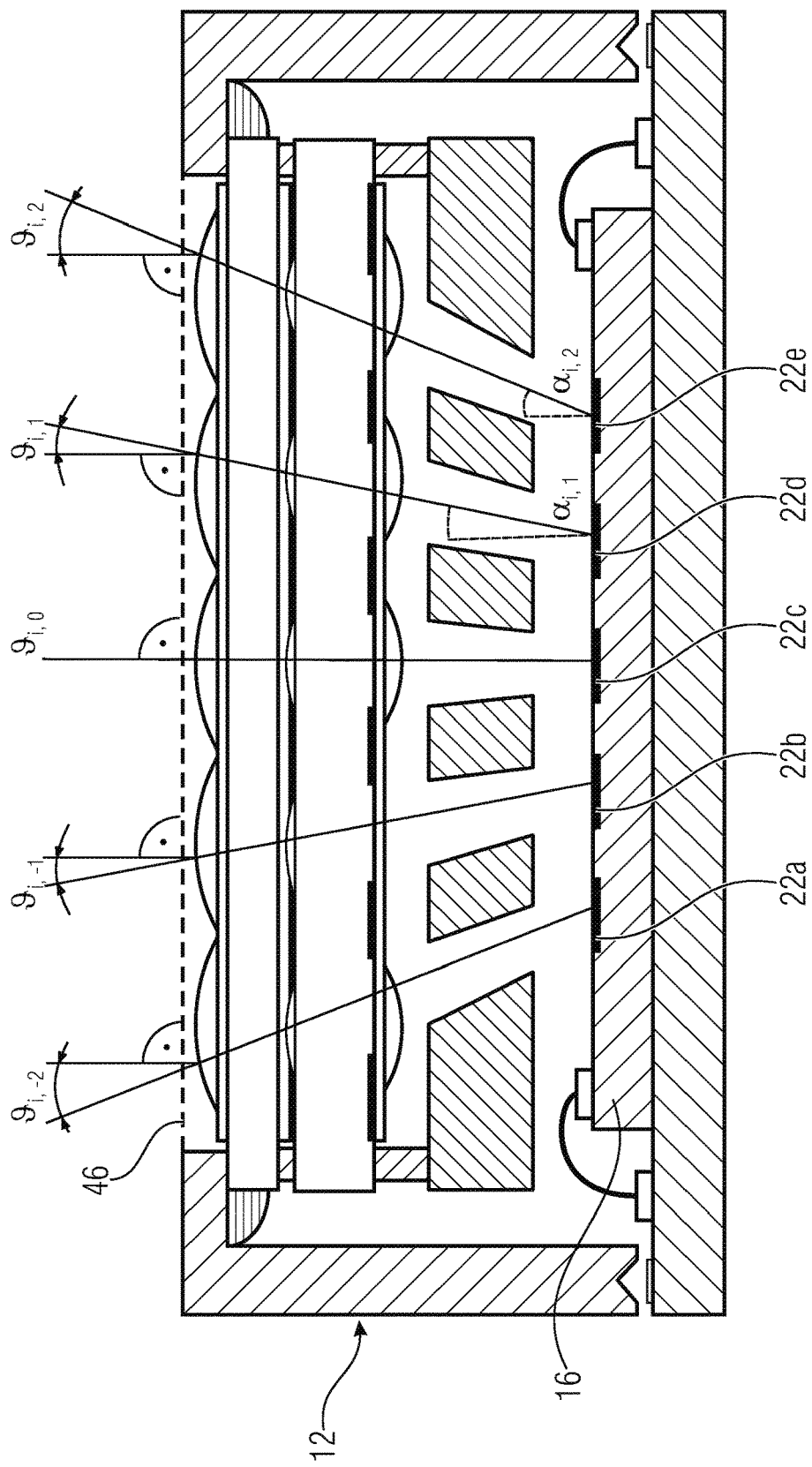

=== PAGE 1 ===

DEVICE AND METHOD FOR RELATIVE POSITIONING OF MULTI-APERTURE OPTICS COMPRISING SEVERAL OPTICAL CHANNELS IN RELATION TO AN IMAGE SENSOR

CROSS-REFERENCE TO RELATED APPLICATIONS

This application is a continuation of copending International Application No. PCT/EP2015/064284, filed Jun. 24, 2015, which claims priority from German Application No. 10 2014 212 104.3, filed Jun. 24, 2014, which are each incorporated herein in its entirety by this reference thereto.

The present invention relates to a device and a method for relative positioning of multi-aperture optics comprising several optical channels. The present invention further relates to a method for actively aligning multi-aperture optics with a digital image sensor.

BACKGROUND OF THE INVENTION

When manufacturing high-resolution miniaturized camera modules, the step of integrating an objective comprises performing an active alignment process, i.e. actively aligning the objective (object lens) in relation to the image sensor while observing and evaluating the image that arises. This involves moving the objective in relation to the image sensor and evaluating the arising image in accordance with predefined quality criteria of the image sharpness (typically measuring the image contrast and/or the module transfer function [in brief: MTRF] at different positions in the image). Positioning is optimized, e.g., by maximizing the quality criteria measured, and the objective is fixated (e.g. by means of gluing) accordingly in this position in relation to the image sensor. One precondition necessitated for this is that the properties of the objective (e.g. image contrast, MTF) that are drawn on for the quality criteria will change to a sufficiently measurable degree over the shifts in position used in the process, as is known, for example, from US 2013/0047396 A1 or JP 20070269879.

As far as active alignment is concerned, conventional optimization algorithms will fail if the parameters of the objectives vary only slightly in relation to the positioning steps. The latter applies, e.g., to objectives having large depths of focus (and, in particular, multi-aperture objectives comprised of microlens arrays) wherein a change in the z distance between the objective and the image sensor results in only slight changes in the image sharpness that in real cases are difficult to measure.

Due to the rotationally symmetric layout of conventional objectives of miniaturized cameras about the optical (z) axis, industrial automatic assembly machines in most cases exhibit five degrees of freedom (and, accordingly, five axes) for relative positioning of the optics in relation to the image sensor (3x translation along x,y,z axes+2x tilting [tx,ty] about the x and y axes, as is depicted in FIG. 18, for example). Thus, the established active assembly processes and machines are not suitable of aligning objectives which comprise no rotational symmetry about the z axis. These include, for example, anamorphic objectives, objectives comprising directionally selective filter components, but also multi-aperture objectives consisting of microlens arrays.

FIG. 18 shows a schematic image of an assembly layout of multi-aperture imaging optics 12 to form an image sensor chip 16 with a notation of the necessitated degrees of freedom x,y,z (translation), tx, ty, and tz (rotation).

Both restrictions described apply in combination for multi-aperture imaging objectives, in brief multi-aperture optics, such as so-called electronic cluster eyes as are known from WO 2011/045324 A2. The multi-aperture arrangement consists of an array of optical channels that is one- or two-dimensionally extended in the x-y plane, each optical channel capturing a defined part of the entire object field.

The location of the central position of the aperture of each individual optical channel in relation to the center of the associated subimage (as viewed in the x-y plane in each case) here plays a major part in terms of accuracy of the reconstruction and/or the resolution capability of the overall image. The difference between the central position of the aperture and the central position of the associated subimage (pitch difference) has to be adjusted along the translational degrees of freedom in x,y with an accuracy of between half and one pixel pitch of the image sensor used.

This arrangement of multi-aperture optics has been developed specifically in order to realize miniaturized camera modules, in particular those having ultra-thin structural forms (for the purpose of being used in thin devices such as smartphones, tablets, laptops, etc., for example).

Accordingly, microlenses are employed therein which have very small focal lengths (e.g. f=1.2 mm) and, thus, large depths of focus. In accordance with the formula $dz=4*/*(F/\#)^2$ for the depth of focus in the image space (dz) with diffraction-limited imaging of the wavelength W, a value of dz=12.7 μm for light of the wavelength of 550 nm and an f-number of F/#=2.4 is achieved, for example.

FIG. 19 schematically illustrates the requirements in terms of the alignment of multi-aperture optics 12 with an image plane BE of the image sensor 16. The multi-aperture optics 12 comprise several optical channels arranged in a one-dimensional or two-dimensional array and comprising a center. Optical channels located outside the center are configured to receive an obliquely incident principle ray PR. One recognizes that with oblique incidence, at the angle alpha "$\alpha$", of light of the principle ray of the central field point within an external optical channel, the point of intersection with the focal position (=e.g. temporary location of the image sensor during assembly) undergoes a lateral offset ("$\Delta d$") within the depth of focus due to the difference of the z position ("$\Delta z$"). With a pixel pitch of p_px=2 μm of the image sensor and given the correspondingly large maximum lateral offset, the value of "$\Delta z$" is allowed to be $\Delta z$=4.3 μm at the most in accordance with the geometric relation $\tan(\alpha)=\Delta d/\Delta z$ at an angle of incidence of $\alpha$=25°. This value lies within the range of depths of focus, so that any existing active assembly techniques based on evaluating the image contrast do not allow sufficient accuracy in aligning the objective in relation to the image sensor when applied to multi-aperture imaging optics. Thus, FIG. 19 shows a schematic section through a multi-aperture imaging objective in accordance with WO 2011/045324 A2. What is shown are the principle rays for the average lines of vision of the optical channels. The magnification shows the lateral offset $\Delta d$ of the center of the subimage of an external optical channel due to different focal positions $\Delta z$ within the image-side range of depths of focus and of the angle of incidence a of the principle ray PR.

To illustrate this, a numerical example shall be given below.

Camera parameters comprise, e.g., a focal length (f) of 1.2 mm, a pixel pitch ($p_{px}$) of 2 μm, a range of vision having an angle of aperture of horizontally 59°, vertically 46° (diagonally 0°). A maximum angle of incidence (α) on the image plane amounts to 25°. Dimensions of the microlens array amount to (H×W): 7.75 mm×4.65 mm.

This results in associated alignment tolerances as follows: A tolerable shift in the x-y plane amounts to a maximum of 2 pixels, i.e. $\Delta x \leq 4$ μm and $\Delta y \leq 4$ μm. A tolerable twist about the x,y axis (wedge error) amounts to a maximum of half a pixel, i.e.

$$\Delta t_x = \arctan\left(\frac{p_{px}}{2f}\right) \leq 0.05° \text{ and } \Delta t_y = \arctan\left(\frac{p_{px}}{2f}\right) \leq 0.05°.$$

A tolerable twist by the z axis amounts to a maximum of one pixel in the external channels, i.e.

$$\Delta t_z = \arctan\left(\frac{p_{px}}{H/2}\right) \leq 0.03°.$$

A shift in the z axis (distance error) amounts to a maximum of one pixel pitch (Δd) in external optical channels->

$$\Delta z = \frac{\Delta d}{\tan(\alpha)} \leq 4.3 \text{ μm}.$$

Known methods for aligning optics with an image sensor are known, for example, as active alignment and attempt to adjust individual lenses or entire assemblies in relation to an image sensor as a function of the quality (in most cases, of the contrast) of the respective image taken.

Known devices for active camera objective alignment primarily relate to assembling rotationally symmetric optics, so-called 5D active alignment, in relation to an image sensor in a production environment and for large numbers of items. Such devices and assembly techniques used are not modifiable to match the needs of active assembly of multi-aperture objectives. For example, an accuracy of the assembled axes is too small. For example, [1] describes that an x,y,z translation can be adjusted with an accuracy of ±5 μm, and a tx,ty, and/or tz twist can be adjusted with an accuracy of ±0.1°, which is insufficient for multi-aperture optics according to the above numerical example. The insufficient accuracy of the assembly processes is based on an evaluation of the image contrast, on a closed system environment and, accordingly, on a lack of access to driving the positioning system and to readout of the camera boards used. For example, a manufacturer of the device will specify the same test pattern, irrespective of which client (optics manufacturer) uses the device.

An assembly system which uses a combination of passive and active alignment is known from US 2013/0047396. Said system exhibits the same limitations as were described above.

A method of active camera optics assembly of several camera modules while using the evaluation of the image contrast is known from JP 20070269879. This method, too, is difficult or even impossible to adapt to the requirements of multi-aperture optics.

Alternative concepts describe an active objective holder. As an alternative to active alignment and fixation, imaging objectives may be mounted in holders that enable later positioning between the objective and the image sensor to be effected at a later point in time, as are described in US 2011/0298968 A1, for example. Additional feedback to the image sensor, an evaluation unit or a sensor is enabled by an active function such as autofocus or optical image stabilization. The designs necessitated for this involve a large amount of effort, are therefore costly and limit miniaturization of the camera modules. In the field of miniaturized multi-aperture optics or extremely miniaturized multi-aperture cameras, utilization of such micromechanical components is hitherto unknown for reasons of cost and in terms of reducing the size of the design.

Therefore, what is desirable is a concept enabling production of multi-aperture camera devices which comprise increased image quality and smaller production tolerances.

SUMMARY

According to an embodiment, a device for relative positioning of multi-aperture optics having several optical channels in relation to an image sensor may have: a reference object arranged such that the reference object is imaged to an image region per channel by the multi-aperture optics in the optical channels; a positioning device controllable to change a relative location between the multi-aperture optics and the image sensor; a calculating device configured to determine actual positions of the reference object in at least three image regions in images of the reference object and to control the positioning device on the basis of a comparison of the actual positions with positions.

According to another embodiment, a method of relative positioning of multi-aperture optics having several optical channels in relation to an image sensor may have the steps of: arranging a reference object such that the reference object is imaged to an image region per channel by the multi-aperture optics in the optical channels; providing a positioning device controllable to change a relative location between the multi-aperture optics and the image sensor; determining actual positions of the reference object in at least three image regions in images of the reference object; comparing the actual positions with positions; and controlling a positioning device on the basis of said comparison.

The core idea of the present invention consists in having recognized that the above object can be achieved in that positioning of the multi-aperture optics in relation to the image sensor may be effected on the basis of a reference object captured by the image sensor; an alignment of the multi-aperture optics in relation to the image sensor on the basis of positions where a reference object or a reference pattern on the reference object is imaged in image regions of the image sensor can be effected with high precision. A comparison of the actual positions with positions, e.g. global or local centers of the image sensor, enables adjustment on the basis of the comparison of positions.

In accordance with one embodiment, a device for relative positioning of multi-aperture optics includes a reference object, a positioning device, and a calculating device. The reference object is arranged such that the reference object is imaged to one image region per channel by the multi-aperture optics in the optical channels. The positioning device is controllable to change a relative location between the multi-aperture optics and the image sensor. The calculating device is configured to determine actual positions of the reference object in at least three image regions in images of the reference object and to control the positioning device on the basis of a comparison of the actual positions with positions. The positions can be central positions or other reference positions, for example, in a respective one and/or in other image regions. Alternatively or additionally, the positions may be target positions deposited for the comparison, for example. On the basis of the comparison with regard to the three image regions, high image quality, a small positional deviation and, therefore, a high level of production tolerance of the overall device with regard to several or even all of the image regions can be achieved.

A further embodiment provides a device wherein the calculating device is configured to control a fixation device configured to harden a glue arranged between the multi-aperture optics and the image sensor. This enables fixation of the adjusted relative position between the multi-aperture optics and the image sensor.

A further embodiment provides a device wherein the image sensor comprises at least an inner image region and four outer image regions arranged in a radially distributed manner around the inner image region. The four outer image regions are arranged along a roll axis, for example an x axis, and a pitch axis, for example a y axis. The outer image regions are arranged in opposing pairs in parallel with the roll axis and in parallel with the pitch axis, for example in a rectangle. The calculating device is configured to determine a pattern deviation of a pattern in the inner and the at least four outer image regions on the basis of the comparison of the actual positions with the positions. This enables centering the test image in the inner image region and subsequent adjustment of the respective images in the outer image regions, so that positional deviations with regard to the roll axis, the pitch axis, and the yaw axis can be advantageously reduced while exploiting symmetries of the positional deviations.

A further embodiment provides a device wherein the calculating device is configured to focus an image that is captured in the inner image region from the reference object, which means that a magnification distance reaches a magnification distance target value so as to determine a lateral difference of the actual position for the inner image region on the basis of a pattern deviation along the roll axis and along the pitch axis, and to control the positioning device such that the lateral differences with regard to the roll axis and the pitch axis reach a respective target value, so that the image is obtained such that it is focused and centered in the inner image region. The calculating device is further configured to determine a measure of wedge error differences of pattern distances for the four outer image regions and to control the positioning device such that the multi-aperture optics are tilted in relation to the roll axis and the pitch axis, so that the wedge error difference reaches a target roll value and/or a target pitch value. The calculating device is further configured to determine a rotational difference of the pattern deviation for the four outer image regions along a first local and a second local lateral direction of the respective outer image regions, and to control the positioning device such that same rotates the multi-aperture optics about the yaw axis, so that the rotational differences reach a target rotational value. The calculating device is further configured to determine a measure of a difference in magnification of the pattern deviation for each of the outer image regions along a direction in parallel with the roll axis and along a direction in parallel with the pitch axis, and to control the positioning device such that same shifts the multi-aperture optics along the yaw axis, so that the differences in magnification reach a target magnification value.

What is advantageous about this embodiment is that alignment of the multi-aperture optics in relation to the image sensor is enabled in six degrees of freedom about the inner image region on the basis of said focusing and centering of the image in relation to the inner image region, so that a high level of precision of the positioning is achieved.

In accordance with a further embodiment, the calculating device is configured to perform said focusing and centering of the image in relation to the inner image region prior to a or any alignment in relation to the outer image regions, so that each of the wedge errors, rotational errors and/or magnification errors of the outer image regions in relation to the inner image region can be reduced.

What is advantageous about this embodiment is that a level of precision of the positioning is further increased.

A further embodiment provides a method for relative positioning of the multi-aperture optics comprising several optical channels in relation to the image sensor.

BRIEF DESCRIPTION OF THE DRAWINGS

Embodiments of the present invention will be detailed subsequently referring to the appended drawings, in which:

FIG. 16 shows a schematic lateral sectional view including the multi-aperture optics and the image sensor for illustrating the relationships of FIG. 15 in accordance with an embodiment;

DETAILED DESCRIPTION OF THE INVENTION

Figure 1:
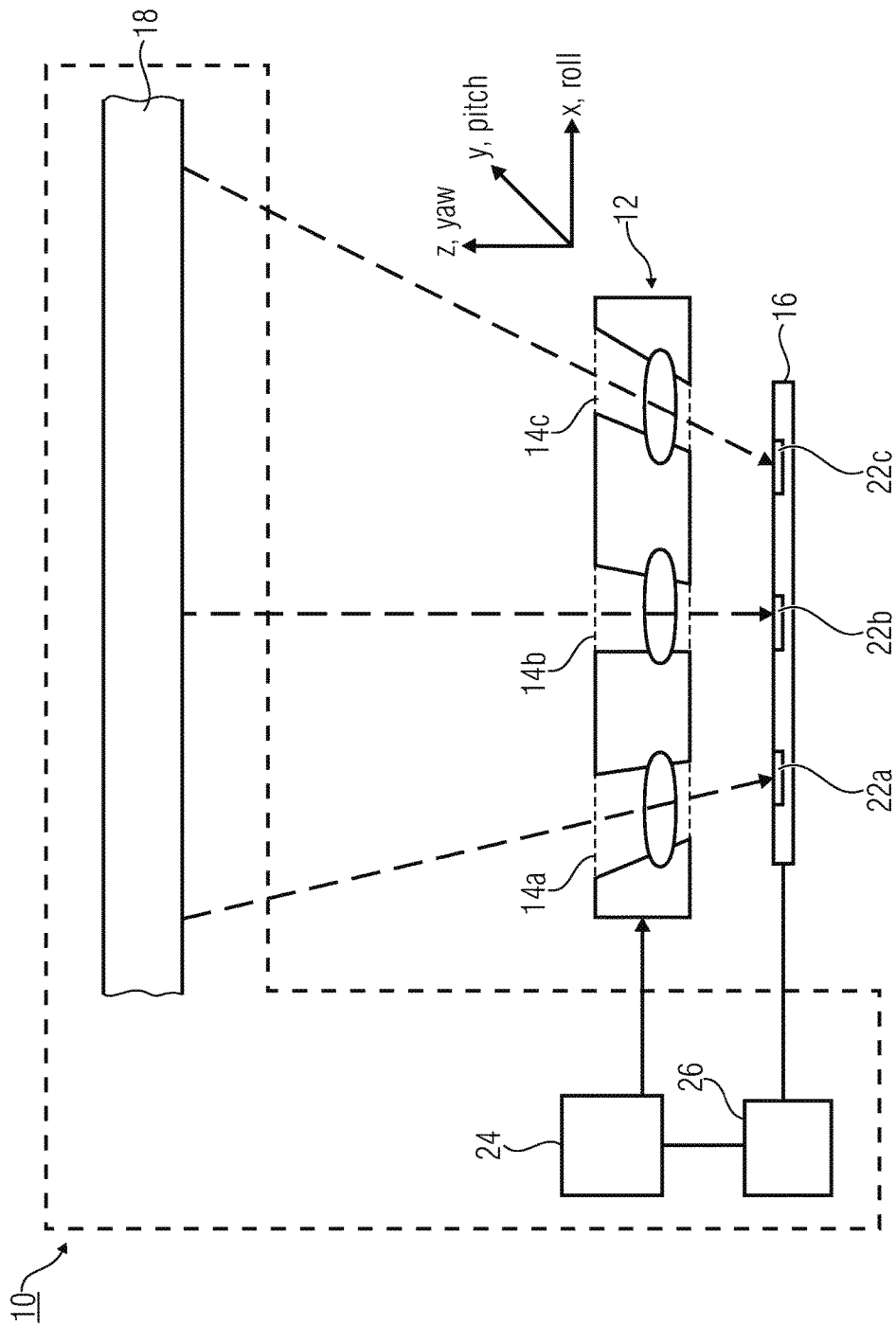
FIG. 1 shows a schematic block diagram of a device for relative positioning of multi-aperture optics comprising several optical channels in relation to an image sensor in accordance with an embodiment.

Before detailed explanations shall be given below regarding embodiments of the present invention by means of the drawings, it shall be noted that elements, objects and/or structures that are identical or have identical functions or identical actions are provided with identical reference numerals in the various figures, so that the descriptions of said elements presented in different embodiments are mutually exchangeable and/or mutually applicable.

In the following, reference shall be made to the alignment of multi-aperture optics and an image sensor with several image regions, in relation to each other. Relative alignment may basically be performed in six degrees of freedom, which describe a translation along three spatial directions x, y, and z as well as a rotation about the x, y, and z axes. In addition, the following explanations relate to a roll axis, a pitch axis, and a yaw axis that are arranged, for simplified understanding, in parallel, or congruently with the x, y, and z axes, respectively, of an inner image region in the three-dimensional space in the event of an ideal alignment of the multi-aperture optics in relation to the image sensor. In this context, x, y, and/or z coordinates relate to a respectively local coordinate system within an image region of the image sensor. Roll, pitch, and/or yaw coordinates or directions relate to a global coordinate system wherein the image sensor and/or the multi-aperture optics are arranged.

The coordinate system of the inner image region of the image sensor and the (global) coordinate system determined by the roll, pitch and yaw axes may comprise an identical origin and, consequently, an identical pivot point when, e.g., the multi-aperture optics are twisted or moved about the global origin. The coordinate systems are described as Cartesian coordinate systems, it also being possible to use other coordinate systems as the underlying basis. They may be mutually transformable by means of a coordinate transformation. Embodiments described below may be carried out or implemented without any restriction in terms of the advantages even when other coordinate systems are used as the underlying basis.

FIG. 1 shows a schematic block diagram of a device 10 for relative positioning of multi-aperture optics 12 comprising several optical channels 14a-c in relation to an image sensor 16. The device 10 includes a reference object 18 arranged such that the reference object 18 is imaged to an image region 22a-c per channel by the multi-aperture optics 12 in the optical channels 14a-c.

The device 10 includes a positioning device 24 controllable to change a relative location between the multi-aperture optics 12 and the image sensor 16. Advantageously, the positioning device is configured to move the multi-aperture optics 12 in accordance with six degrees of freedom in the three-dimensional space in relation to the image sensor 16. However, it is also feasible for the positioning device 24 to be configured to move the image sensor 16 in the three-dimensional space. Moreover, it is conceivable for the positioning device to move the multi-aperture optics 12 or the image sensor 16 along less than six degrees of freedom in the three-dimensional space.

The device 10 further includes a calculating device 26 configured to determine, in images of the reference object 18, actual positions of the reference object 18 in the at least three image regions 22a-c and to control the positioning device 24 on the basis of a comparison of the actual positions with positions. The positions may be reference positions to which the reference object 18 is imaged in an adjusted state, for example central positions of the image regions 22a-c (local) or of the image sensor 16 (global).

For example, the calculating device 26 is configured to receive and evaluate the respective image in the image regions 22a-c. The image sensor may be a charge-coupled device (CCD), a complementary metal-oxide semiconductor (CMOS), or any other digital image sensor.

The image regions 22a-c may be arranged at or in the image sensor 16 such that they are spaced apart from one another. Alternatively, the image regions 22a-c may also be part of a continuous pixel matrix, which may be distinguishable from each other, for example by means of different ways of addressing the respective pixels. For example, each of the image regions 22a-c is configured to capture a portion of the reference object 18. In the respective portion, for example, a test pattern or part thereof may be arranged such that the respective test pattern of the respective portion is imaged in the respective image region 22a-c; once arranged, the test pattern may be disposed such that can be captured for one, several or all of the image regions 22a-c.

Defined alignment of two of the components of multi-aperture optics 12, image sensor 16, and reference object 18, for example defined alignment and/or positioning of the reference object 18 in relation to the image sensor 16 or in relation to the multi-aperture optics 12, enables evaluation of a target image that is to be captured from the reference object 18 in the image regions 22a-c when the multi-aperture optics 12 have an error-free position or alignment in relation to the image sensor 16 or are arranged within acceptable tolerances. Relative alignment between the multi-aperture optics 12 and the image sensor 16 may therefore be effected on the basis of a comparison of actual positions and (target) positions. This means that the calculating device is configured to control the positioning device on the basis of a comparison of the actual position of an image region in relation to actual positions in other image regions.

As compared to an alignment based on a contrast of the captured image, this enables high precision since the contrast that is based on a depth-of-focus range of the multi-aperture optics 12 leads to imprecise or even erroneous results. A distance between the reference object 18 and the image sensor 16 may, for example, be smaller than 2 m, smaller than 1 m, or smaller than 50 cm. In principle, the distance between the reference object 18 and the image sensor 16 may be dependent on the application, in accordance with the implementation of the image sensor 16, with the multi-aperture optics 12, and/or with an envisaged magnification or resolution.

Figure 2:
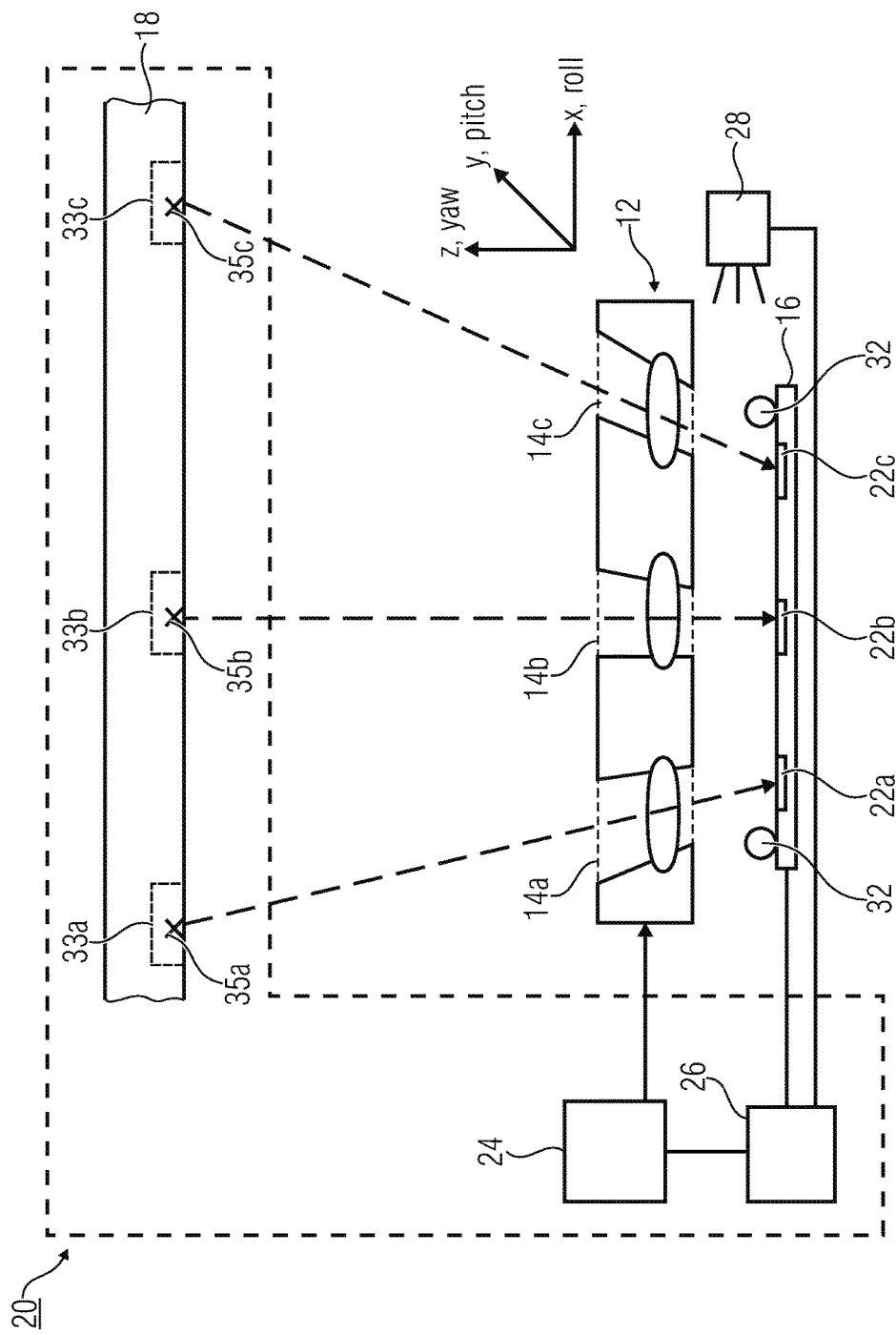
FIG. 2 shows a schematic block diagram of a device upgraded as compared to the device of FIG. 1 in that a calculating device is configured to control a fixation device in accordance with an embodiment.

FIG. 2 shows a schematic block diagram of a device 20 which as compared to device 10 is upgraded in that the calculating device 26 is configured to control a fixation device 28. The fixation device 28 is configured to harden a glue 32 arranged between the multi-aperture optics 12 and the image sensor 16. For example, when the multi-aperture optics 12 are positioned in relation to the image sensor 16, said multi-aperture optics 12 may be contacted with the image sensor 16 by means of the glue 32. The glue 32 may, for example, be an adhesive that can be hardened in ultraviolet (UV) light. The fixation device 28 may be a UV light source, for example, which emits UV light on the basis of being driven by the calculating device 26, so as to harden the glue 32. Alternatively, the glue 32 may be a thermosetting adhesive, it being possible for the fixation device 28 to be configured as a heat source. In principle, the fixation device 28 may also be configured to establish a different mechanical connection between the image sensor 16 and the multi-aperture optics 12, for example a clamped, a screwed, a riveted, and/or a soldered connection.

What is advantageous in the above is that a set relative position between the multi-aperture optics 12 and the image sensor 16 may possibly be fixated without any further intermediate step and, thus, addition of positioning errors may be prevented. Alternatively, the fixation device 28 may also be part of the device 20.

The reference object 18 has a pattern in the form of subpatterns and/or markings 35a-c arranged thereat in reference regions 33a-c, so that in each case one subpattern 35a-c is captured by one of the optical channels 14a-c and is imaged to a respective image region 22a-c as a marker. This enables alignment of the image sensor 16 with the reference pattern on the reference object 18 for subsequent adjustment of the multi-aperture optics, it being possible for the alignment to be performed, for example, by using optical laws and zero-deviation multi-aperture optics.

Utilization of a test pattern on the reference object enables, for example, evaluation of the image regions 22a-c by the calculating device 26 on the basis of an edge detection in the image regions 22a-c. Algorithms for this can be employed in an accurate and robust manner. Suitable markings on the reference object may be crosses, circles, or H structures, for example, which follow a geometric arrangement. In principle, other structures may also be arranged—however advantageously such structures which exhibit large edge lengths in relation to point structures. Even though in above explanations, arrangement of the markers was described as an x configuration, it is also feasible for the markers to occur in a star constellation, in a circle constellation or the like, whereby the markers are possibly projected into more, fewer, and/or other image regions on the image sensor. The above-described embodiments enable simple adaptation of the determination of positions and of the evaluation of the positional deviations, so that different test patterns are readily applicable.

Figure 3A:
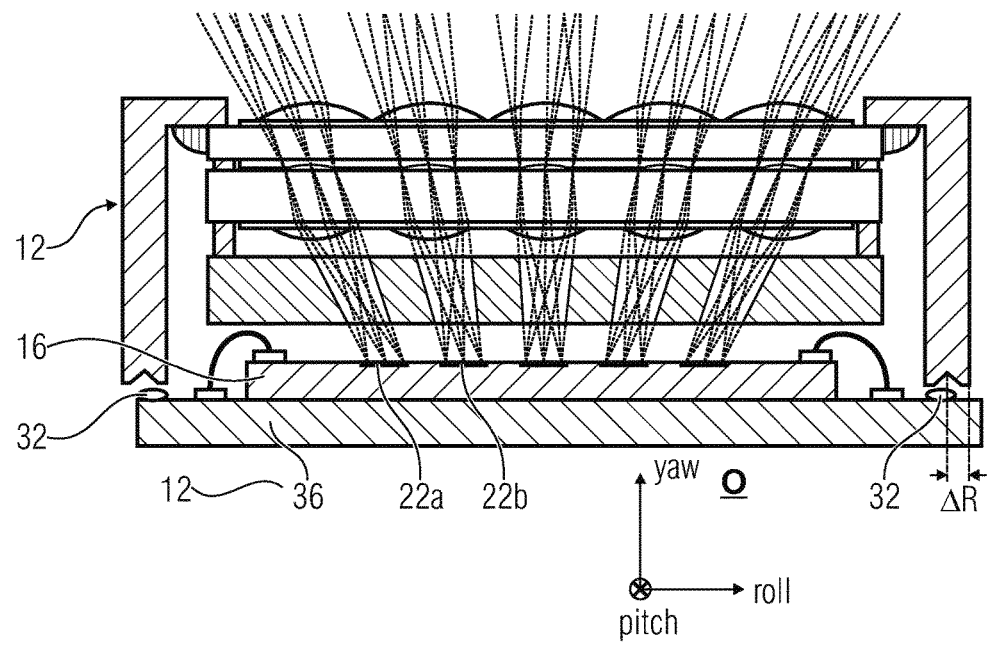
FIG. 3a shows a schematic lateral sectional view of the multi-aperture optics which exhibit a position error, in relation to the image sensor, along the negative roll direction in accordance with an embodiment.
Figure 3B:
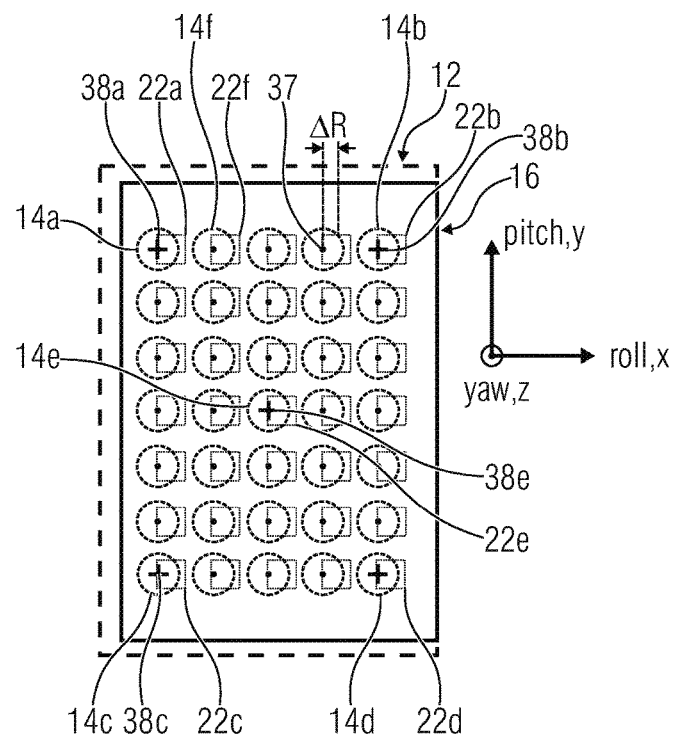
FIG. 3b shows a schematic top view of the situation of FIG. 3a in accordance with one embodiment.

Subsequent explanations relate to driving steps conveyed from the calculating device 26 to the positioning device 24 so as to drive the latter such that the respective multi-aperture optics are moved in the three-dimensional space in relation to the image sensor. The error compensation steps described below will be described in a sequence which advantageously enables accurate alignment of the multi-aperture optics in six degrees of freedom in relation to the image sensor. The positioning device 26 may alternatively be configured to perform only one or more of the described error compensation steps and/or to perform same in a modified sequence FIG. 3a shows a schematic lateral sectional view of the multi-aperture optics 12 which exhibit, in relation to the image sensor 16, a position error along the negative roll direction. FIG. 3b shows a schematic top view of this situation. In FIG. 3a, the image sensor 16 is arranged at a printed circuit board 36 and contacted with same, so that the captured images of the image regions 22a-f from the image sensor 16 can be obtained by the calculating device at the printed circuit board 36.

A lateral position error along the negative roll direction results in a relative difference in positions ΔR between the image sensor 16 and the multi-aperture optics 12. Microimage centers of the optical device, i.e. centers 37 of the optical channels 14a-f, have undergone, by way of example, a linear shift by the difference in positions ΔR along the negative roll direction.

The reference object comprises a test object structure. To this end, for example markings in the form of one or more crosses "+" are arranged as markings, for example the markings 35, on the reference object, which are captured as markers 38a-e by means of the optical channels 14a-f in the respective image regions 22a-e.

A coordinate origin of the coordinate system spanned by the roll axis, the pitch axis, and the yaw axis can be arranged in an origin of the local x/y/z coordinate system of the inner image region 22e. A calculating device, for example the calculating device 26, is configured to focus the marking 38e in relation to the image region 22e. To this end, the calculating device may be configured to drive a positioning device, e.g. the positioning device 24, such that same changes a distance of the multi-aperture optics 12 in relation to the image sensor 16 along the z axis with regard to the image region 22e, so that the marker 38e is focused in the image region 22e. This means that the calculating device is configured to determine a measure of a magnification distance of pattern distances of the actual position (location to which the marker 38 is imaged) for the inner image region 22e and to control the positioning device such that same shifts the multi-aperture optics 12 along the z axis, or yaw axis, so that the magnification distance reaches a magnification distance target value. For example, the calculating device 26 may be configured to determine an extension of the pattern 38e along one or both axes x and/or y of the inner image region 22e and to compare same with a comparison value. If the captured pattern of the marker 38e is larger or smaller, a distance between the multi-aperture optics 12 and the image sensor 16 may be increased or reduced, respectively.

The calculating means is configured to determine, for example subsequently thereto, a measure of a lateral difference of the actual position of the marker 38e for the inner image region 22e on the basis of the pattern deviation, for example with regard to the coordinate origin of the x and y axes. This means that the calculating device is configured to determine a measure of a lateral difference along the x axis and a measure of a lateral difference for a pattern deviation along the y axis. The calculating means is configured to control the positioning device such that the lateral differences reach a respective target value.

To put it simply, this means that the positioning device shifts the multi-aperture optics 12 and/or the image sensor 16 along the x axis and/or the y axis (in a global coordinate system along the roll axis and/or the pitch axis) until the lateral difference target values are reached. For example, one or both lateral difference target values may be reached by protecting the marker 38e into the coordinate origin of the local coordinate system of the image region 22e. The tolerance range may be defined, for example, by a tolerable deviation, for example, a shift by one or two pixels, or by an achievable measurement accuracy. The achievable measurement accuracy may be based, for example, on the distance of two pixels, so that a deviation of the projection of the marker 38e with regard to the coordinate origin of the image region 22e, which deviation is smaller than a pixel distance and is possibly not detected, can be considered as being sufficiently accurate, so that the respective lateral difference target value is reached.

The glue 32 is arranged between the printed circuit board 36 and the multi-aperture optics 12, so that a set position of the multi-aperture optics 12 in relation to the image sensor 16 can be fixated.

In other words, FIGS. 3a and 3b show an offset of the objective by means of an x translation. A position error due to a y translation may produce an equivalent resulting image in the corresponding sectional view.

All of the microimage centers (center of the dashed circles) are linearly shifted, in the x and/or y dimension(s), in relation to centers of the respective image regions by a distance ΔR along the roll axis. The alignment is possibly effected solely by means of the determined image coordinates of the test object structure (i.e. of the marker 38e) in the central optical channel 14e, which comprises the coordinates $x_{0,0}$, $y_{0,0}$, $x_{i,j}$ and/or $y_{i,j}$ indicating a relative position of the respective image region as is described, for example, for positions on the reference object for FIG. 15.

Initially, the image of the test object structure is focused in the central optical channel (translation along the z axis). Subsequently, the objective is shifted along the x axis and/or along the y axis until the geometric center of the image of the central test object is located at the center, i.e. in the origin of the global coordinate system O, of the image matrix. The following equivalent conditions can be met for the measured image coordinate of the test object structure:

$$(x_{0,0}, y_{0,0}) \xrightarrow{equal\ to} 0 = (0, 0)$$

$$r_{0,0} - O = 0$$

with $r_{i,j} = \sqrt{x_{i,j}^2 + y_{i,j}^2}$ wherein $r_{i,j}$ describes, for example, the radial coordinate of the bit field which has the indices (i,j) in the global image coordinate system.

$r_{imax}$, $r_{jmax}$, $r_{-imax}$, and $r_{-jmax}$ relate to the radial coordinate of that outer image region which in +i, −i, +j, and −j, respectively, comprises a maximum position in relation to those image regions to which the markers are imaged.

Since the result of "zero" may possibly not be achieved, in reality, by the difference in the image coordinates measured, either rounding of the result to a quantity corresponding to the desired precision of the assembly (magnification distance target value and/or lateral difference target values), or a corresponding control value which is higher than the difference resulting from the rule, is defined, so that the deviations lie within the tolerance range. This also applies to the conditions of the fine alignment steps described below.

FIGS. 3a and 3b as well as the alignment of the multi-aperture optics in relation to the image sensor, which alignment is described in this context, may be performed as a coarse alignment preceding one, several, or any of the adjustment steps described below.

Figure 4A:
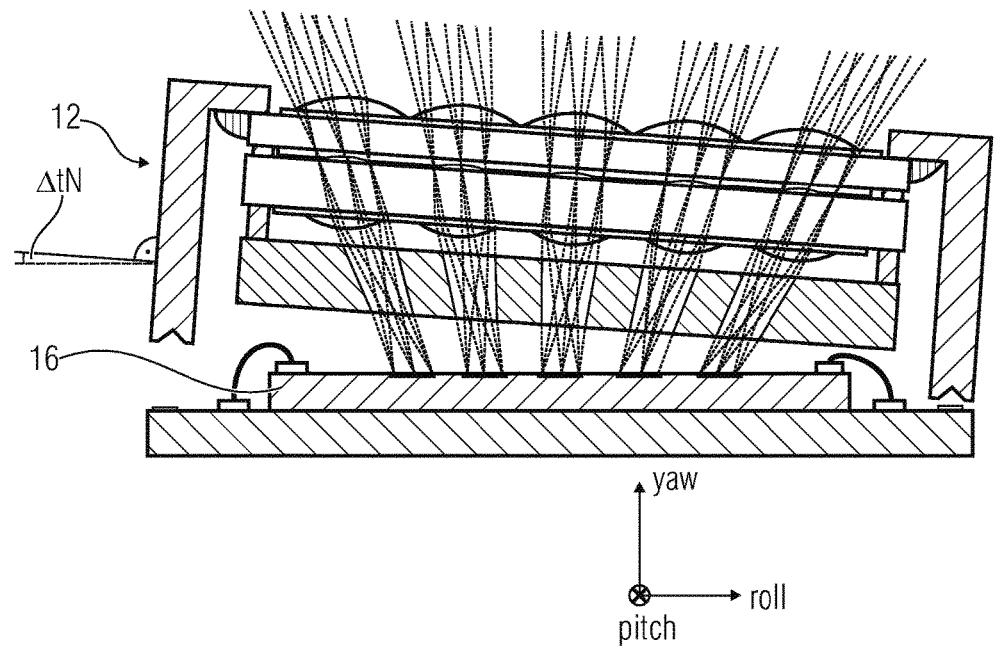
FIG. 4a shows a schematic lateral sectional view of the multi-aperture optics which exhibit a wedge error, in relation to the image sensor, with regard to the pitch axis in accordance with an embodiment.
Figure 4B:
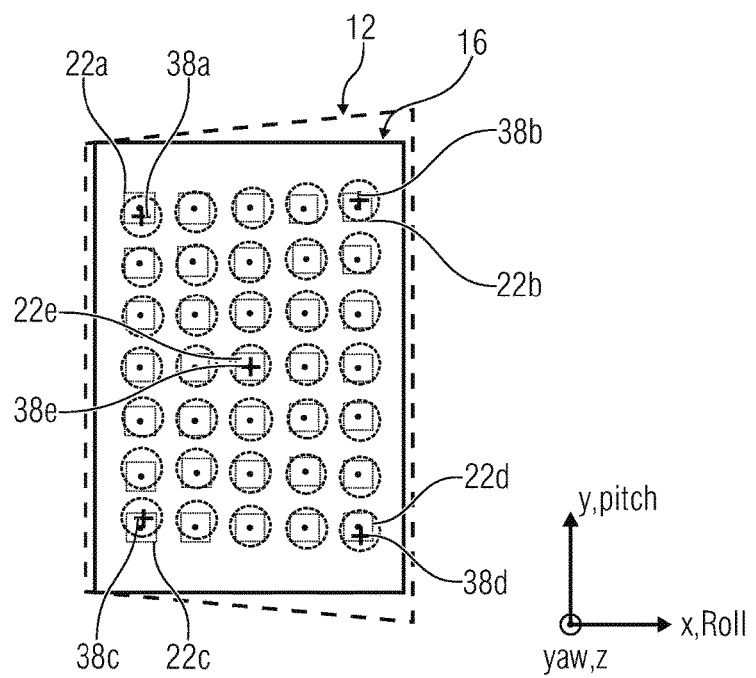
FIG. 4b shows a schematic top view of the situation of FIG. 4a in accordance with an embodiment.

FIG. 4a shows a schematic lateral sectional view of the multi-aperture optics 12, which exhibit a wedge error ΔtN with regard to the pitch axis in relation to the image sensor 16. I.e., with regard to the pitch axis, the multi-aperture optics 12 are tilted by the angle ΔtN in relation to the image sensor 16. FIG. 4b shows a schematic top view of the situation of FIG. 4a. The test pattern on the reference object is centered and focused with regard to the central image region 22a, which means that the marker 38e is projected onto the image region 22e such that the distance target value and the lateral difference target values with regard to the x axis and the y axis are reached. The wedge error results in that the markers 38a-d exhibit deviations in the x and/or y direction(s).

The calculating device is configured to determine the shifts of the markers 38a-d with regard to the centers, such as the geometric centers, of the image regions 22a-d. For example, if the focal position of the multi-aperture optics 12 exhibits errors in relation to the image sensor 16, the wedge error may be determined by the calculating device by the fact that the distances of the markers 38a-e in relation to the centers of the image regions 22a-d are identical for each pair. A pair may be compensated for, for example upon rotation of the multi-aperture optics 12 about the roll axis (about the x axis—tx) in that the calculating device drives the positioning device such that the multi-aperture optics 12 are rotated about the roll axis until the distances of the markers 38a and 38c, and 38b and 38d, respectively, are identical in relation to the respective centers of the image regions 22a-d.

In addition, a wedge error caused by a rotation about the pitch axis (about the y axis—ty) may be compensated for in that the calculating device drives the positioning device such that same rotates the multi-aperture optics 12 about the pitch axis until the distances of the markers 38a and 38b, and 38c and 38d, respectively, are identical in relation to the respective centers of the image regions 22a-d. This means that the respective distances of the markers 38a-d in relation to the centers of the image regions 22a-d may comprise a measure of a wedge error difference of pattern distances of the actual position with regard to the respective outer image region 22a-d, and that the calculating device is configured to determine said wedge error difference. By tilting the multi-aperture optics 12 in relation to the roll axis or the pitch axis, the wedge error differences may be changed such that they reach a target roll value or a target pitch value which, as was described above, may lie about a zero value within a tolerance range. Prior to the wedge error compensation, coarse alignment as was described for FIGS. 3a and 3b may be performed.

In other words, for aligning the multi-aperture optics 12 during a twist tx about the x axis and/or during a twist ty about the y axis, this means during wedge error compensation, initially the image of the test object structure is focused in the central optical channel, i.e. translation along the z axis is performed. Subsequently, the image is centered in the image origin O=(0,0) by being shifted along the x axis and/or the y axis. The wedge error results in different radial distances of the measured positions of the images of the test object structures in the corner channels, i.e. of the outer image regions 22a-d, from the respective image origins. This may be at least partly corrected by rotating the multi-aperture objective by the x axis and/or the y axis (roll axis and/or pitch axis) until the following conditions for the outer image regions 22a-d are met:

upon rotation about the x axis (tx):

$r_{imax,jmax} \xrightarrow{equal\ to} r_{imax,-jmax}$ equivalent to $r_{imax,jmax} - r_{imax,-jmax} = 0$ as well as $r_{-imax,jmax} \xrightarrow{equal\ to} r_{-imax,-jmax}$ equivalent to $r_{-imax,jmax} - r_{-imax,-jmax} = 0$ upon rotation about the y axis (ty):

$r_{imax,jmax} \xrightarrow{equal\ to} r_{-imax,jmax}$ equivalent to $r_{imax,jmax} - r_{-imax,jmax} = 0$ as well as $r_{imax,-jmax} \xrightarrow{equal\ to} r_{-imax,-jmax}$ equivalent to $r_{imax,-jmax} - r_{-imax,-jmax} = 0$ The wedge errors may be axially symmetrical with regard to the roll axis (twist about the roll axis) and/or with regard to the pitch axis (twist about the pitch axis) for the four outer image regions.

Thus, FIGS. 4a and 4b show the offset of the objective by a twist about the y axis (y wedge error)—the twist about the x axis may produce an equivalent resulting image in the corresponding equivalent lateral view. The results of a twist about a positive or negative angle of rotation may also be determined and/or compensated for by analogy with above explanations.

Figure 5:
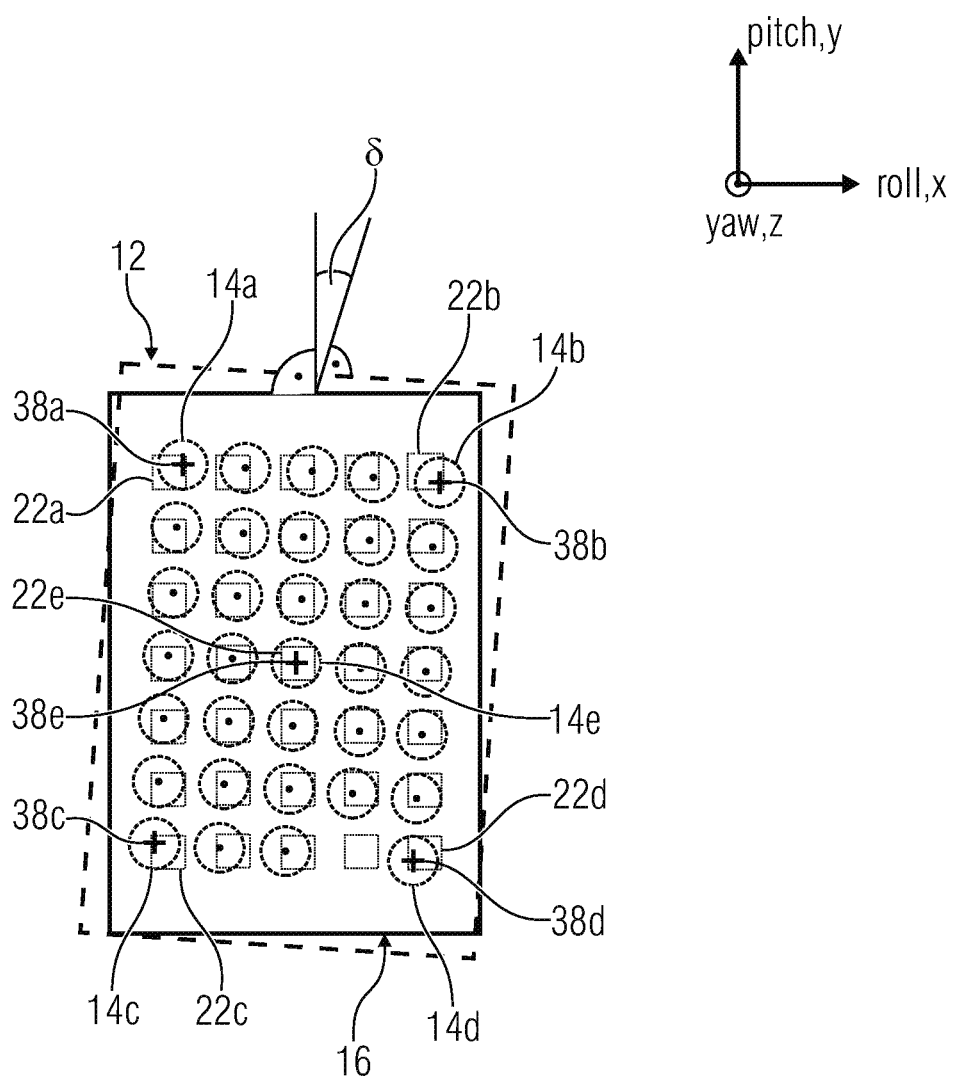
FIG. 5 shows a schematic top view of the multi-aperture optic twisted, in relation to the image sensor, by an angle about the yaw axis, or z axis, in accordance with an embodiment.

FIG. 5 shows a schematic top view of the multi-aperture optics 12, which are twisted, in relation to the image sensor 16, by an angle δ about the yaw axis, or z axis, of the central image region 22e. The calculating device is configured, for example, to determine the distance of the markers 38a-d from the centers of the respective outer image regions 22a-d. On the basis of the rotation by the angle δ, the markers 38a-d each have a distance from the respective center. Said distance is more or less identical along the respective x direction for the image regions 22a and 22b. Likewise, the distance for the image regions 22c and 22d is identical in the x direction. In the y direction of the respective image region, the distance is roughly identical for the image regions 22a and 22c, and 22b and 22d, respectively. A measure of the x distances with regard to the image regions 22a and 22b, and 22c and 22d, respectively, as well as a measure of the distances along the y direction for the image regions 22a and 22c, and 22b and 22d, respectively, can be determined by the calculating device as a measure of a rotational difference of the pattern deviation for each of the outer image regions 22a-d.

The calculating device is configured to control the positioning device such that same rotates the multi-aperture optics 12 and/or the image sensor 16 about the yaw axis. The rotational difference δ can be reduced by means of the rotation about the yaw axis until it reaches a target rotational value which is zero, for example, within a tolerance range. The rotational error may be rotationally symmetrical, for the four outer image regions 22a-d, with regard to the origin of the global coordinate system.

In other words, upon a twist tz about the t axis of the central image region, this means in order to correct the z twist, alignment initially involves focusing the image of the test object structure in the central optical channel (translation along the z axis) and subsequently centering same in the image origin O=(0,0) by shifting same along the x axis and/or the y axis. The twist about the z axis results in a shift, which is equal in quantity for optical channels 14a-d symmetrically positioned about the central inner image region 22e, of the images of the test structures 38a-d in the respectively local coordinate system, i.e.:

$r'_{-imax,jmax} = r'_{-imax,-jmax} = r'_{imax,-jmax} = r'_{imax,jmax}$ with radial local coordinates $r'_{i,j} = \sqrt{x'_{i,j}{}^2 + y'_{i,j}{}^2}$ in the respective outer optical channel 14a-e with the index (i,j) and/or the associated image region 22a-e.

Figure 6A:
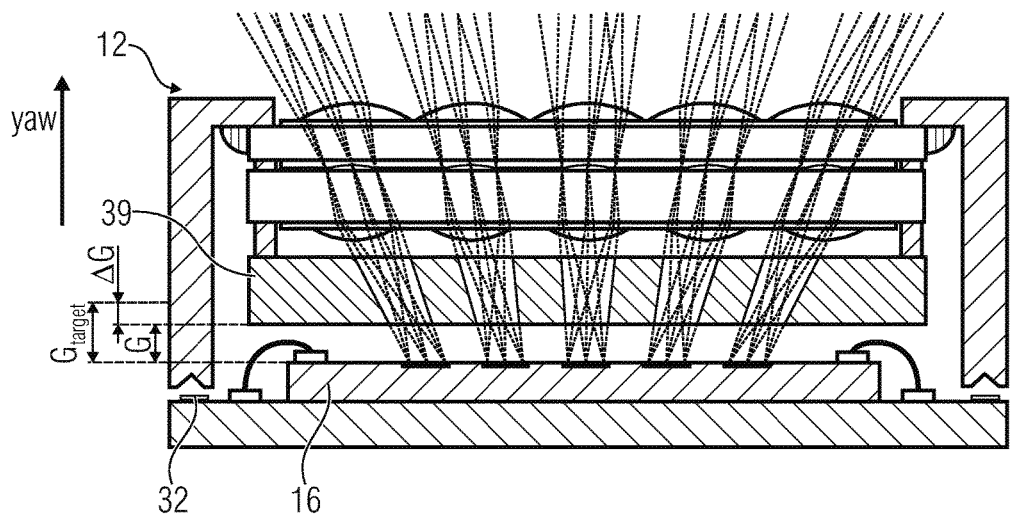
FIG. 6a shows a schematic lateral sectional view of the multi-aperture optics which exhibit too small a distance, in relation to the image sensor, along the yaw axis in accordance with an embodiment.

FIG. 6a shows a schematic lateral sectional view of the multi-aperture optics 12 which comprise, in relation to the image sensor 16, too small a distance G as compared to a target value $G_{target}$ along the yaw axis. The distance G may, in the multi-aperture optics 12, relate to a distance between a surface, facing the image sensor 16, of a spurious light suppressing structure 39 of the multi-aperture optics 12 and a surface of the image sensor 16 that faces the spurious light suppressing structure 39. Alternatively, the distance G may also relate to a distance between a surface of the image sensor 16 that faces the multi-aperture optics 12 and that of a different reference plane of the multi-aperture optics 12, for example a lens plane facing the object region or the image sensor, or a different reference plane. Moreover, the distance G may also relate to a different reference plane with regard to the image sensor 16, for example to a surface on which the image sensor 16 is arranged at the printed circuit board 32. The target value $G_{target}$ can relate to the back focal distance of the multi-aperture optics 12 and/or to the distance G between the multi-aperture optics 12 and the image sensor 16 at which a desired or optimum sharpness of the image projected into the image plane can be obtained. The target value $G_{target}$ can be referred to as a distance target value. Alternatively or additionally, the target value $G_{target}$ may relate to any other target value of a distance between the multi-aperture optics 12 and the image sensor 16. A deviation, for example a difference, between the distance target value $G_{target}$ and the distance G can be referred to as a difference in distances ΔG, for example represented by ΔG=G−$G_{target}$ or ΔG=$G_{target}$−G. If the difference in distances has a value different from 0, this may result in a determinable magnification error, which means that the object region is possibly imaged into too large or too small an image.

Figure 6B:
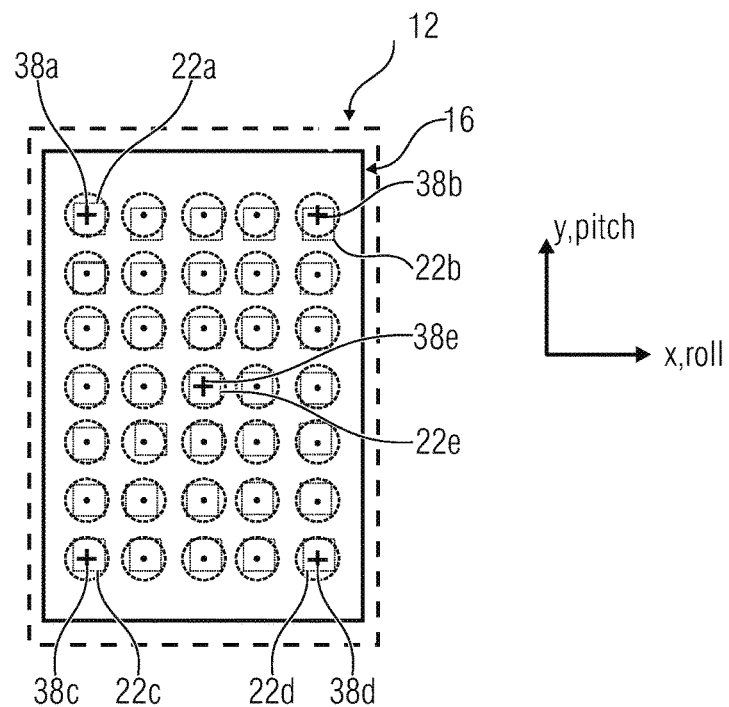
FIG. 6b shows a schematic top view of the situation of FIG. 6a in accordance with an embodiment.

FIG. 6b shows a schematic top view of the multi-aperture optics 12 and the image sensor 16 for this situation. Compared to a distance G that is set correctly, so that, for example, the difference in distances ΔG has roughly a value of 0, the reference object comprising the markers 38a-e can be represented or imaged in a magnified manner on the basis of the too small a distance G and, consequently, of a difference in distances ΔG having a value different from 0 (e.g. smaller than 0). This results in that the markers imaged in the outer image regions 22a-d comprise an increased radial distance, along the global roll axis and pitch axis, in relation to the center of the central inner image region 22e. With regard to the respective local x/y coordinate systems this means that the marker 38a is shifted, within the image region 22a, toward negative x and positive y values, the marker 38b is shifted toward positive x and positive y values, the marker 38c is shifted toward negative x and negative y values, and the marker 38d is shifted toward positive x and negative y values. A corresponding shift is more or less equal along the respective x direction for the image regions 22b and 22d, and 22a and 22c, respectively, as well as along the respective y direction for the image regions 22a and 22b, and 22c and 22d, respectively, so that here, too, a symmetry with regard to the local and/or global coordinate origins exists.

With reference to FIG. 6a, the calculating device is configured to determine a measure of the difference in distances ΔG by determining, for example, for at least one, several or each of the outer image regions 22a-d, the radial local coordinates into which the respective marker 38a-d is imaged. A deviation from the zero value, which means that the respective marker 38a-d is positioned outside the respective center (x=0, y=0) of the respective image region 22a-d, may be determined as the measure of the difference in distances ΔG of the pattern deviation by means of the calculating device. The calculating device is configured to control the positioning device such that same shifts the multi-aperture optics 12 along the yaw axis, so that the differences in distance ΔG of the image regions 22a-d reach the target distance value $G_{target}$, e.g. in that the distance is varied or changed for such time until the markers 38a-d are imaged in the centers of the image regions 22a-d. The difference-in-distances target value may lie, for example, around the zero value within a tolerance range for the difference in distances ΔG or around the target value $\Delta G_{target}$ within the tolerance range. Once any tilting errors have been compensated for, as has been described, for example, for FIGS. 4a and 4b, the difference in distances ΔG may be identical with regard to the outer image regions 22a-d.

Figure 7A:
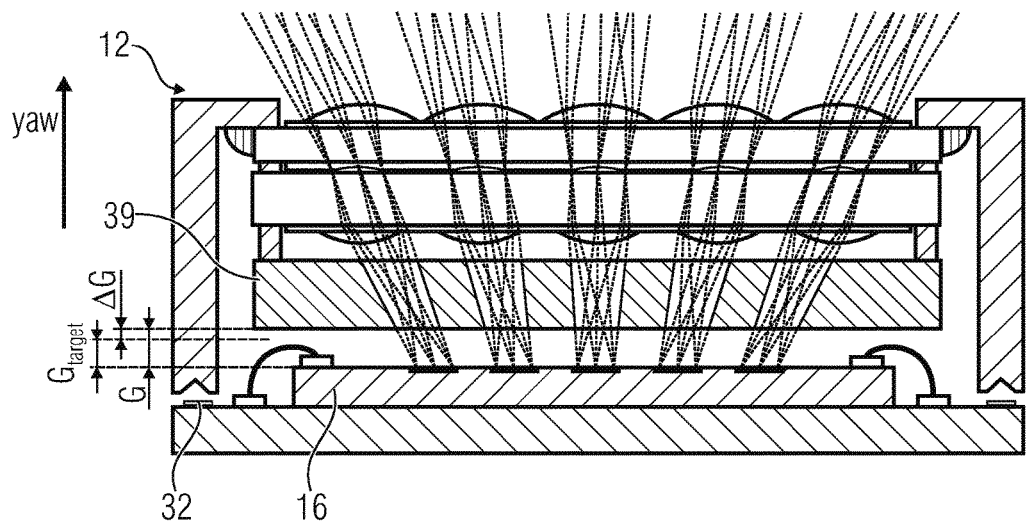
FIG. 7a shows a schematic lateral sectional view of a situation wherein the multi-aperture optics exhibit too large a distance in relation to the image sensor in accordance with an embodiment.
Figure 7B:
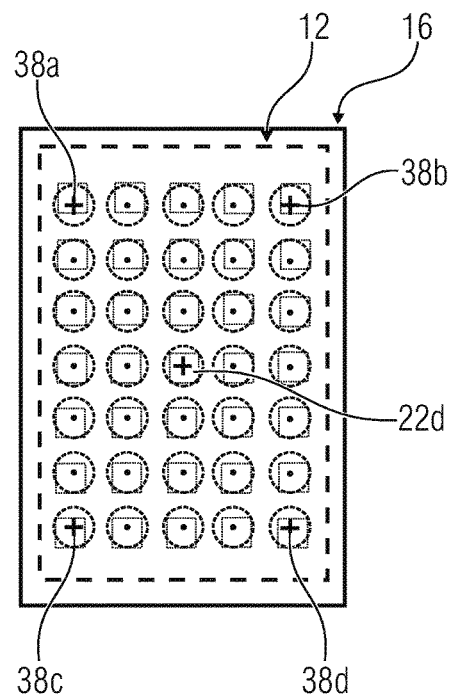
FIG. 7b shows a schematic top view of the situation of FIG. 7a in accordance with an embodiment.

FIG. 7a shows a schematic lateral sectional view of a situation wherein the multi-aperture optics 12 in relation to the image sensor 16 comprises too large a distance G as compared to the target value $G_{target}$, i.e. the markers 38a-d are shifted in the direction of the inner image region 22d in each case. FIG. 7b shows a schematic top view of the situation of FIG. 7a. The calculating device is configured to control the positioning device to move the multi-aperture optics 12 and/or the image sensor 16 in such a manner that the distance G and, consequently, a measure of the difference in distances ΔG, is reduced so that the differences in distance ΔG reach the (difference-in-distance) target value.

In other words, the difference between the target focal distance and the actual focal distance is to be reduced as far as possible. To this end, the determination of the magnification in the image region 22a may be used. If due to the manufacturing tolerances the target focal length and, thus, the target value for the back focal distance of the optics are not accurately reached, the magnification in the image region 22e may be measured, following coarse alignment, and the test pattern for the fine alignment can be adapted accordingly by using the knowledge of the realized magnification (or of a focal length derived therefrom). An exact numerical value of the back focal distance may possibly be neglected.

To this end, for example during alignment during translation along the z axis (correction of the distance error), the image of the test object structure is initially coarsely focused in the central optical channel (translation along the z axis) and is subsequently centered in the image origin O=(0,0) by being shifted along the z axis and/or the y axis. In the event of too small a z distance of the multi-aperture objective in relation to the image sensor, the images of the test structures in the corners of the array are shifted toward larger (in terms of magnitude) global image coordinates. In the event of too large a distance, said shifting is reversed, so that the images of the test structures are shifted toward smaller (in terms of magnitude) global image coordinates. Accordingly, the z distance is varied for such time until the images of the test structures lie within the centers of the respective channels and/or until the following condition, while taking into account the tolerance range, is met:

$$r'_{-imax,jmax} = r'_{-imax,-jmax} = r'_{imax,-jmax} = r'_{imax,jmax} = 0$$

Figure 8A:
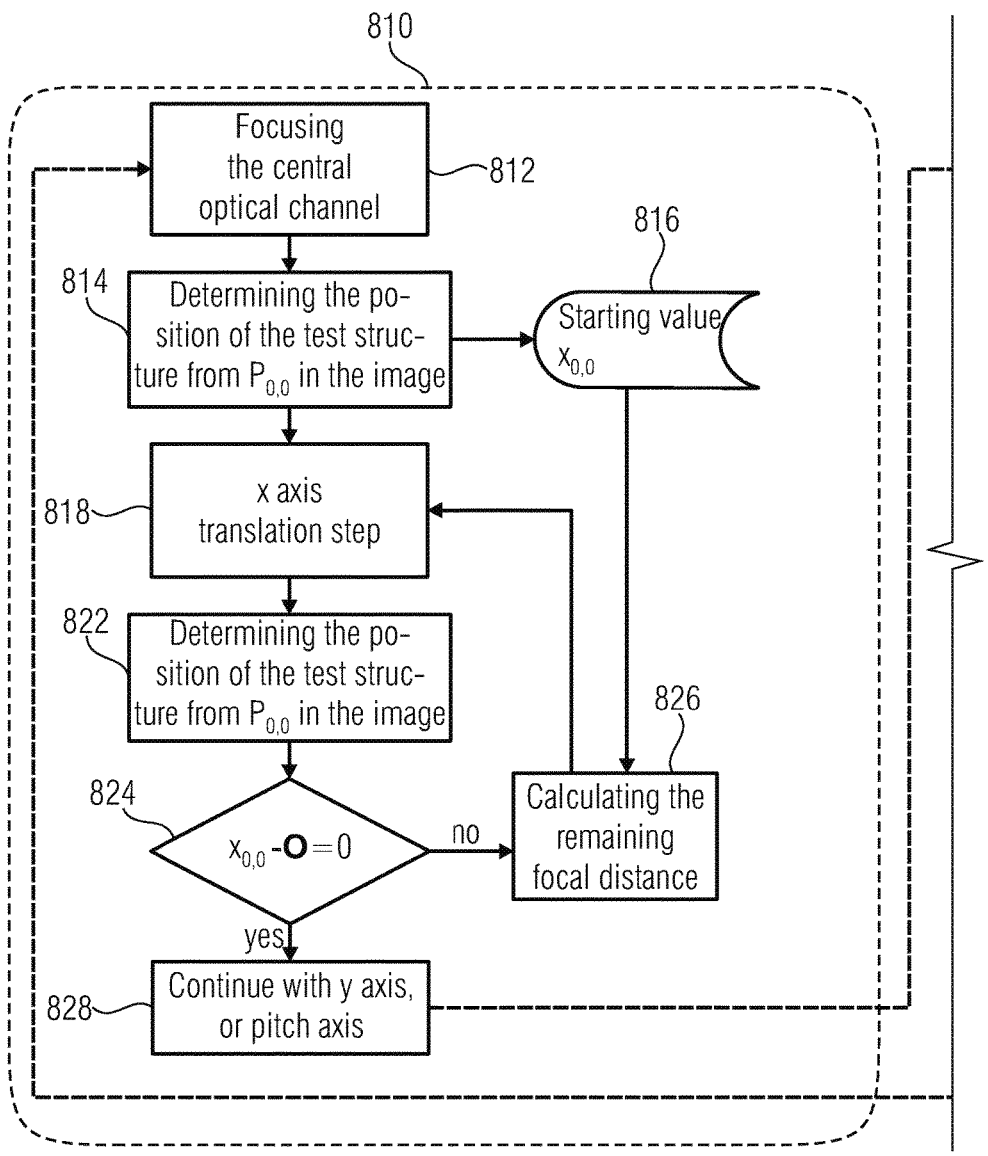
FIGS. 8a-8b show a schematic flowchart of a method for correcting an offset of the multi-aperture optics in relation to the image sensor by means of an x translation and/or a y translation, as is described for FIGS. 3a and 3b, in accordance with an embodiment.
Figure 8B:
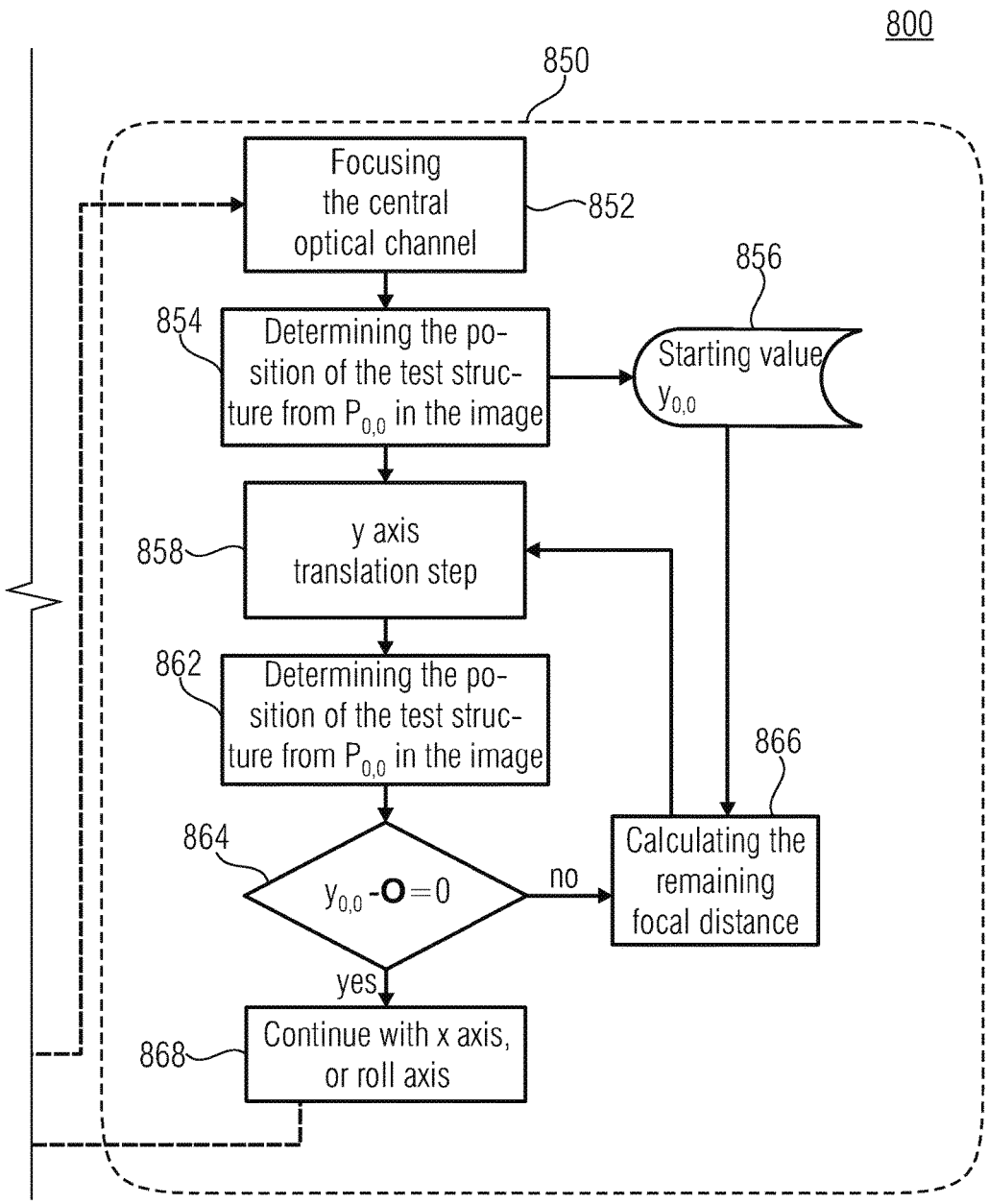

FIGS. 8a-8b show a schematic flowchart of a method 800 for correcting an offset of the multi-aperture optics in relation to the image sensor by means of an x translation and/or a y translation, as is described for FIGS. 3a and 3b. The method 800 comprises two process stages 810 and 850. By means of the process stage 810, a position error along the x axis, or roll axis, may be compensated for. By means of the process stage 850, a position error may be compensated for by means of a translation along the y direction, or pitch direction, it being possible, once the process stage 810 or 850 has been performed, to switch to the respectively other process stage, or to end the process 800. The process 800 may alternatively be started with the process stage 810 or the process stage 850, the subsequent illustrations describing, by way of example, a start of the method 800 by means of the process stage 810. This means that the process stages 810 and 850 and, consequently, the correction of the position along the x direction and the y direction can be sequentially performed and that consequently, the target roll value and the target pitch value are sequentially reached one after the other.

A step 812 of the process stage 810 involves focusing the central optical channel or a subarea of the reference object in relation to the central optical channel. A step 814, which follows step 812, involves determining, for example by means of the calculating device, the position of the respective test structure, i.e. of the marker that is imaged in the inner image region, from $P_{0,0}$ in the respective image. Thus, the determination is based on global coordinates of the central optical channel $P_{0,0}$, as is described for FIG. 15.

A step 816, which follows step 814, involves storing the determined position along the roll axis, or local x axis, as a starting value $x_{0,0}$, for example in a reference value storage of the calculating device.

A step 818 involves shifting the multi-aperture optics, in relation to the image sensor, along the x axis in a translation step. A focal distance of the translation step may be, for example, a focal distance of a motor or actuator of the positioning device or of a control quantity for controlling the positioning device. A step 822, which follows step 818, involves determining the position of the test structure from $P_{0,0}$ in the inner image region, as is described for step 814.

In a comparison 824, which follows step 822, the calculating device is configured to compare the determined position with the origin of the global coordinate system O, for example by forming a difference. If the difference has a value different from zero within a tolerance range (decision "no), the calculating device is configured to calculate, in a step 826, a remaining focal distance on the basis of the starting value stored in step 816, and to switch to the state 818 so as to perform a further translation step along the x axis. If in the decision 824, the difference has a value of zero within the tolerance range ("yes" decision), the multi-aperture optics may be referred to as being aligned, in relation to the image sensor, along the x axis, or roll axis, so that an end 828 is reached from which one can switch to the process stage 850. This means that step 818 is possibly repeated for such time until the target roll value is reached.

A step 852 of the process stage 850 involves focusing the received image, for example the marker 38e, in relation to the central optical channel, for example the optical channel 14e. A step 854, which follows step 852, involves determining the position of the test structure in the image. The determined position along the pitch axis, or local y axis, is stored as the starting value $y_{0,0}$ in a step 856.

A step 858, which also follows step 854, involves performing a translation step along the y axis, or pitch axis, i.e. changing a relative position between the image sensor and the multi-aperture optics along the y axis. A step 862, which follows step 858, involves determining again the position of the test structure in the inner image region. As is described for the decision 824, a decision 864, which follows step 862, involves performing a comparison as to whether or not the position $y_{0,0}$ coincides with the center of the global coordinate system O. If this is not the case, i.e. if the decision yields an answer "no", a step 866 involves calculating the remaining focal distance on the basis of the position and the starting value stored in step 856. From step 866, one switches back to step 858 and performs another translation step along the y axis. This is continued for such time until the decision 864 provides the result of "yes", so that the multi-aperture optics may be regarded as being aligned, in relation to the image sensor, along the y axis, and so that in a step 868, one can switch to the process stage 810, or to step 812. Alternatively, the method 800 may be terminated following the decision 824 or 864 if same is answered by "yes". This means that the calculating device is configured to control the positioning device on the basis of a comparison of the actual position of an image region with a target position, e.g. the coordinate origin, in relation to the image region.

In other words, FIGS. 8a-8b show a summarizing overview of fine alignment for centering purposes. The process may be started, equivalently, either in the x or the y dimension.

Figure 9A:
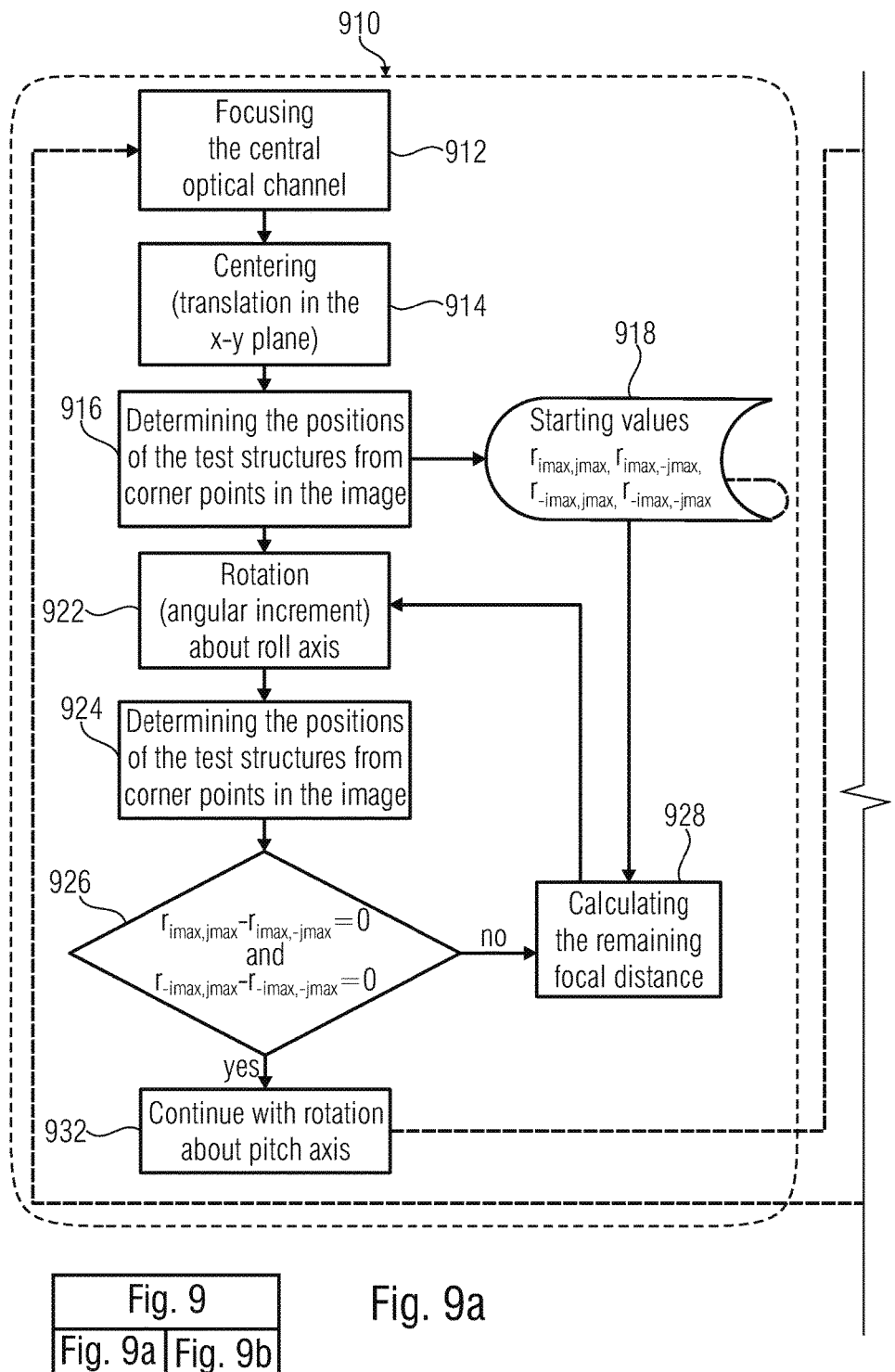
FIGS. 9a-9b show a schematic flowchart of a method that can be performed by the calculating device so as to compensate for the wedge error as described with regard to FIGS. 4a and 4b, in accordance with an embodiment.
Figure 9B:
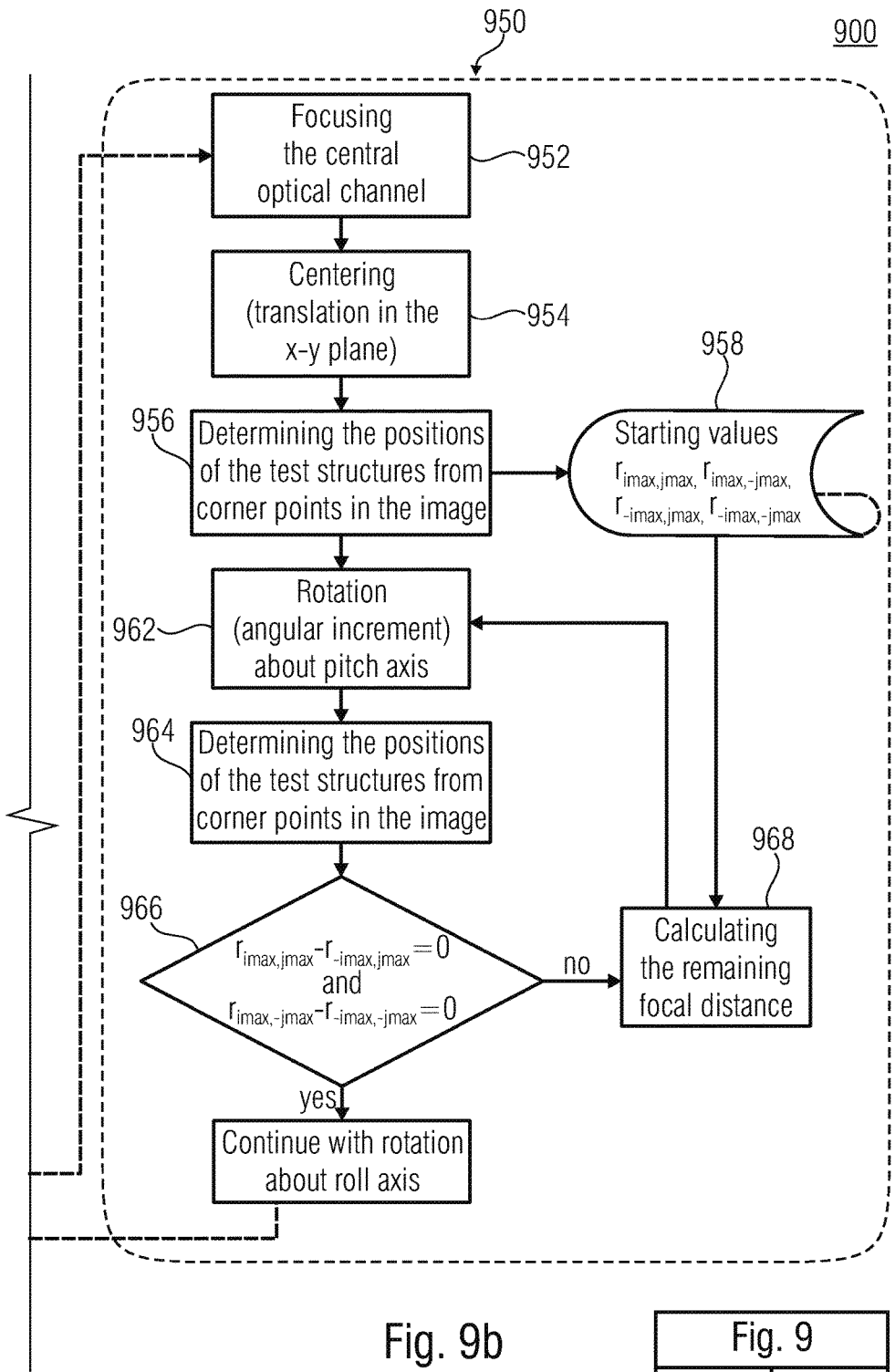

FIGS. 9a-9b show a schematic flowchart of a method 900 that may be performed by the calculating device so as to compensate for the wedge error as is described with reference to FIGS. 4a and 4b. The method 900 includes a process stage 910 and a process stage 950. By means of the process stage 910, the wedge error in relation to the x axis, i.e. the roll axis, may be reduced or compensated for. By means of the process stage 950, the wedge error in relation to the y axis, i.e. the pitch axis, may be reduced or compensated for. The process stages 910 and 950 can be performed independently of each other, it being possible to switch from process stage 910 to process stage 950 or to switch from process stage 950, once same has been performed, to process stage 910. This means that the method 900 can be started with process stage 910 or with process stage 950.

By way of example, the method 900 will be described below in such a manner that it starts with process stage 910. A step 912 involves focusing the central optical channel, e.g. the optical channel 14e, in relation to the image region 22e. The step may be performed in the same manner as step 812. A step 914, which follows step 912, involves centering the central optical channel by means of a translation in the x-y plane. The step 914 may be performed in the same manner as step 814.

A step 916, which follows step 914, involves determining the positions of the test from corner points in the image, which means that, e.g., the outer reference markings, for example the markers 38a-d, are determined in terms of their respective outer image regions and their positions therein. The determined positions are stored, in a step 918, as starting values for subsequent positioning. A starting value $r_{imax,jmax}$, $r_{imax,-jmax}$, $r_{-imax,jmax}$, and $r_{-imax,-jmax}$ may describe the position of the test structure in the outer image regions by the maximum (or negative maximum) direction along the roll axis (i) and the pitch axis (j), respectively.

Starting from step 916, a step 922 involves controlling the positioning device such that the multi-aperture optics are rotated, in relation to the image sensor, about the roll axis in an angular increment. As was done in step 916, a step 924, which follows step 922, involves determining the positions of the test structures from corner points in the image. In a decision 926, which follows the determination of positions in step 924, a comparison is performed as to whether the radius distances or the difference $r_{imax,jmax} - r_{imax,-jmax}$ comprises a value of 0 within the tolerance range, or whether a difference $r_{-imax,jmax} - r_{-imax,-jmax}$ comprises a value of 0 within the tolerance range, which means a determination is made as to whether the measure of the wedge error difference reaches a target roll value or a target pitch value.

If the decision 926 is answered by "no", i.e. if at least one of the target roll and target pitch values is not reached, a step 928 involves calculating the remaining focal distance while taking into account the starting values stored in step 918. Starting from step 928, the process returns to step 922 so as to perform another rotation about the roll axis by an angular increment. However, if the decision 926 is answered by "yes", i.e. if both target values are reached, the wedge error regarding the rotation about the roll axis may be regarded as having been compensated for, and starting from a final state 932, the process may switch to the process stage 950, or the method may be terminated.

A step 952 of the process stage 950 involves focusing the central optical channel, as is described for step 912. A step 954, which follows step 952, involves centering the central optical channel, as is described for step 914. A step 956, which follows step 954, involves determining the positions of the outer test structures from corner points in the image, as is described for step 916. On the basis of step 946, the starting values are stored in a step 958, as is described for step 918. A step 962, which follows step 956, involves controlling the positioning device such that the multi-aperture optics are rotated (tilted) in relation to the pitch axis. This means that this step, too, is performed by analogy with the process stage 910, i.e. the step 922, the difference being that the rotation is performed about the pitch axis. A step 964, which follows step 962, involves determining a position, as was performed, for example, in step 956, so as to determine a change in position that was achieved by step 962.

A decision 966 involves verifying whether the wedge error differences have reached the target pitch value. This may be effected, for example, by a difference formation $r_{imax,jmax} - r_{-imax,jmax}$ as well as $r_{imax,-jmax} - r_{-imax,jmax}$. The differences may be verified in terms of whether they adopt the value 0 within the tolerance range, which means that the respective deviations of a difference formation $r_{imax,jmax}$, $r_{-imax,jmax}$, $r_{imax,-jmax}$, and $r_{-imax,-jmax}$ are equal in magnitude. If the decision is answered by "no", a step 968 involves calculating the remaining focal distance while taking into account the starting values from step 958, and switching back to step 962 so as to perform another rotation of the multi-aperture optics about the pitch axis. If in the decision 966 ("yes" decision) the wedge error difference has reached the target pitch value, the pitch wedge error may be regarded as having been compensated for, and the method may be terminated, or one may switch to process stage 910.

Figure 10:
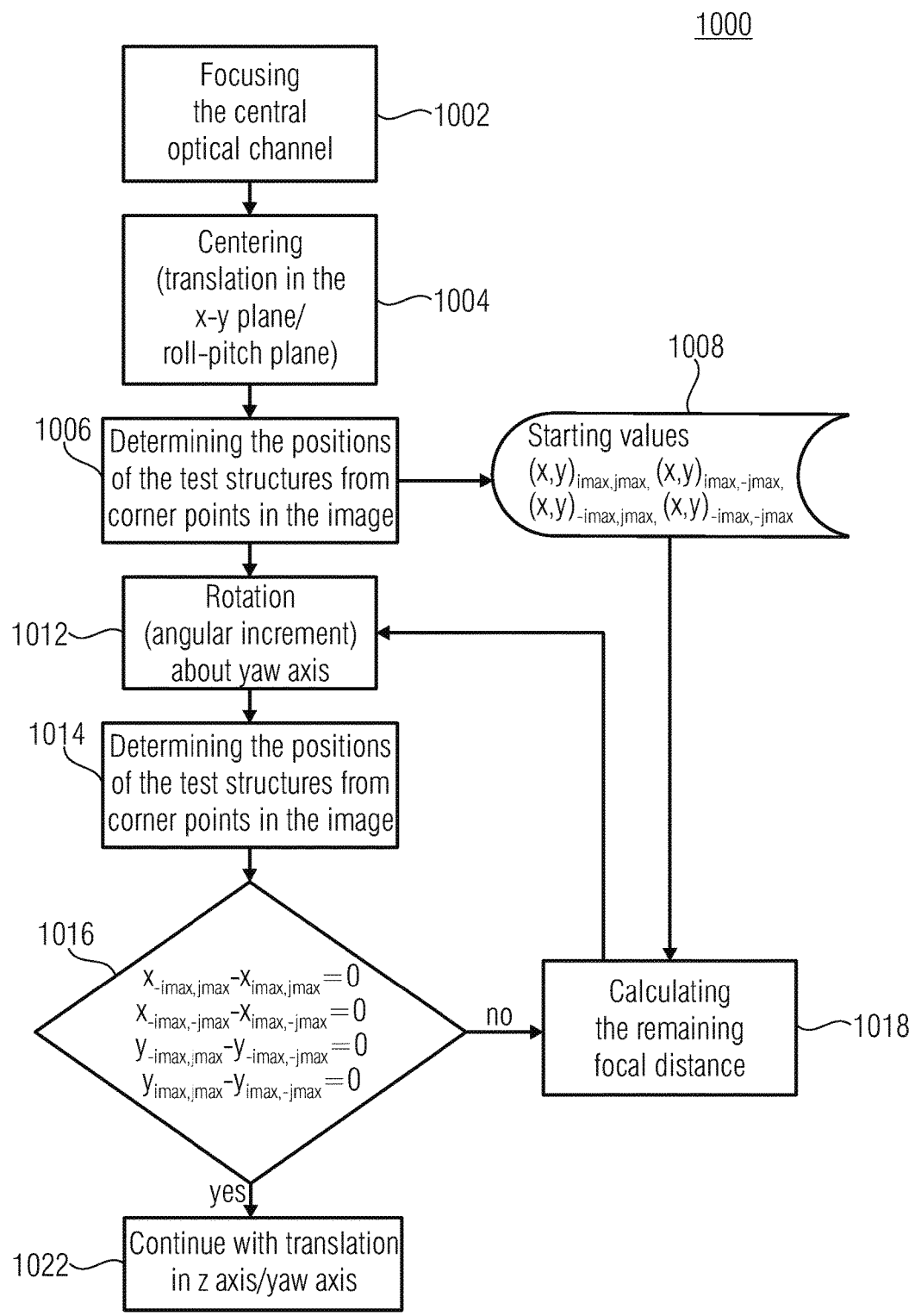
FIG. 10 shows a schematic flowchart of a method of compensating for a twist about the yaw axis, or z axis, of the inner image region as is described for FIG. 5, in accordance with an embodiment.

FIG. 10 shows a schematic flowchart of a method 1000 for compensating for a twist about the yaw axis, or z axis, of the inner image region 22e. The method 1000 may be employed for compensating for an error situation as is described for FIG. 5. A step 1002 involves focusing the central optical channel, as is described for steps 812, 852, 912, and 952. A step 1004 involves centering the inner image region, as is described for steps 814, 854, 914, or 954. A step 1006, which follows step 1004, also involves determining the positions of the test structures, i.e. of the markers 38a-d, from corner points in the image. The positions are determined as being located in the respective image region, for example in one of the outer image regions 22a-d, and are stored as starting values $(x,y)_{imax,jmax}$, $(x,y)_{imax,-jmax}$, $(x,y)_{-imax,jmax}$, and $(x,y)_{-imax,-jmax}$ (step 1008).

A step 1012 involves controlling the positioning device such that the multi-aperture optics perform a rotation about at least one angular increment in relation to the yaw axis, or z axis, of the inner image region. The angular increment may be, e.g., a focal distance of a motor or of an actuator which moves the multi-aperture optics, or may be a control parameter of the positioning device.

A step 1014, which follows step 1012, involves another positioning determination, as is described for step 1006. A decision 1016, which follows the position determination 1014, involves verifying whether the rotational difference has reached a target rotational value, for example by means of a difference formation $x_{-imax,jmax} - x_{imax,jmax} = 0$, $x_{-imax,-jmax} - x_{imax,-jmax} = 0$, $y_{-imax,jmax} - y_{-imax,-jmax} = 0$, and/or $y_{imax,jmax} - y_{imax,-jmax} = 0$, the 0 value being subject to tolerances here, too. If at least one of the equations is not satisfied, i.e. if the decision 1016 yields the answer "no", one switches to step 1018, which involves calculating the remaining focal distance while taking into account the starting values stored in step 1008. Starting from step 1018, one switches back to step 1012 and performs another rotation of the multi-aperture optics. However, if in the decision 1016 all of the equations are satisfied, i.e. if the decision yields the result of "yes", the rotational error may be regarded as having been compensated for, and the method 1000 may be terminated in a step 1022. Starting from step 1022, one may switch, e.g., to compensating for the magnification errors by translating the multi-aperture optics along the z axis, or yaw axis.

Figure 11:
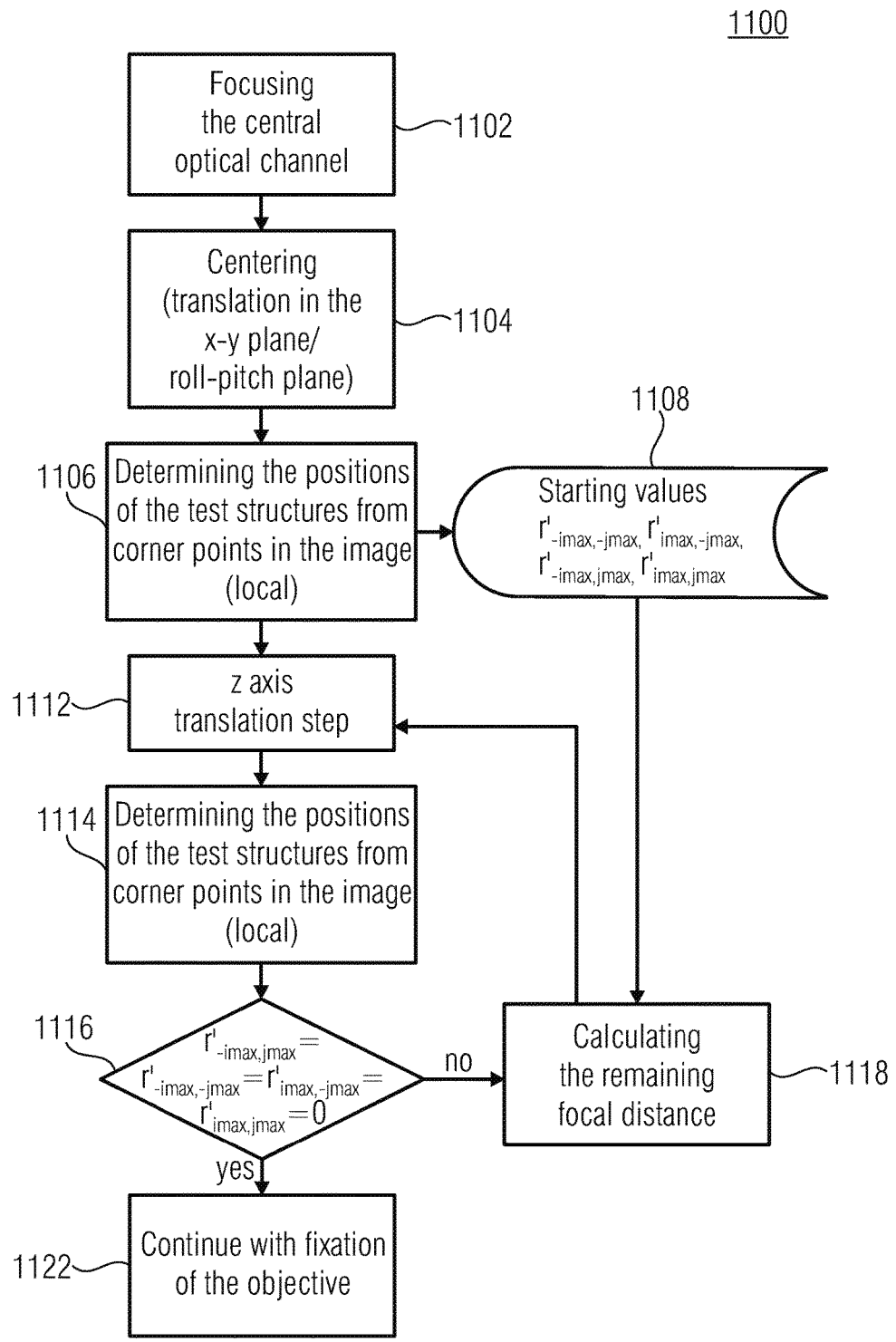
FIG. 11 shows a schematic flowchart of a method for aligning the multi-aperture optics by means of a translation along the z axis, or yaw axis, as is described for FIGS. 6a, 6b, 7a, and 7b, in accordance with an embodiment.

FIG. 11 shows a schematic flowchart of a method 1100 for aligning the multi-aperture optics by translating it along the z axis, or yaw axis, as is described for FIGS. 6a, 6b, 7a, and 7b.

A step 1102 involves focusing the central optical channel. A step 1104, which follows step 1102, involves centering by means of a translation in x/y, as is described, e.g., for step 914.

A step 1106, which follows step 1104, involves determining the positions of the test structures from corner points in the image, it being possible for the determination of positions to be performed while using the respective local coordinate systems of the outer image regions 22a-d. The determined positions are stored as starting values $r'_{-imax,-jmax}$, $r'_{imax,-jmax}$, $r'_{-imax,jmax}$, and $r'_{imax,jmax}$ in a step 1108. A step 1112 involves performing, starting from step 1106, a translation along the z axis, or yaw axis, i.e. driving the positioning device such that the multi-aperture optics are shifted along the yaw axis.

A step 1114, which follows step 1112, involves performing another position determination, as is described for step 1106. A decision 1116 involves verifying whether the positions determined in step 1114 correspond to the respective local coordinate origins, for example in the form of an equation $r'_{-imax,jmax} = r'_{-imax,-jmax} = r'_{imax,-jmax} = r'_{imax,jmax} = 0$. This means that a verification is performed as to whether a difference in distances reaches a difference-in-distances target value. A measure of the difference in distances here may be obtained, for example, by means of the difference (distance) between a detected location where the respective test pattern is projected, and the local coordinate origin. If the decision 1116 yields the result of "no", a step 1118 will involve calculating the remaining focal distance while taking into account the starting values stored in step 1108. Starting from step 1118, for example, one switches back to step 1112 so as to perform another change in position of the multi-aperture optics in relation to the image sensor. If the decision 1116 yields the results of "yes", the magnification error, i.e. the deviation $\Delta G$ along the yaw axis, may be regarded as having been compensated for, and the method 1100 may be terminated. For example, a final step 1122 of the method 1100 may involve initiating fixation of the objective.

FIG. 11 may be described as a summary of the overview of the fine alignment of the translation along the z axis.

Figure 12:
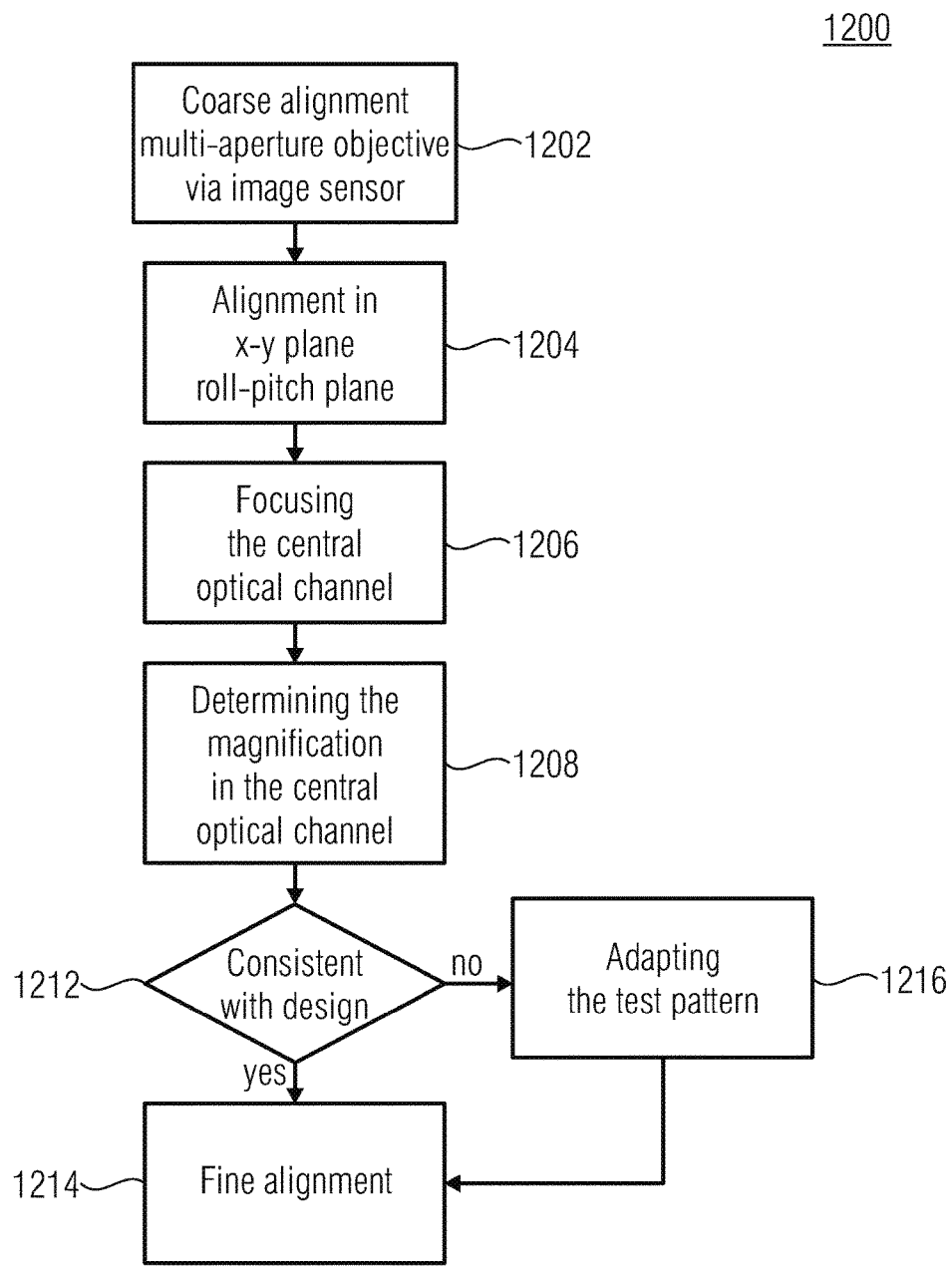
FIG. 12 shows a schematic flowchart of a method as may be performed, for example, prior to one of the methods of any of FIGS. 8a-8b, FIGS. 9a-9b, FIG. 10, or FIG. 11, so as to enable a robust process flow of said methods, in accordance with an embodiment.

FIG. 12 shows a schematic flowchart of a method 1200 as may be performed, e.g., prior to any of the methods 800, 900, 1000, or 1100 so as to enable a robust flow of said methods. A step 1202 involves a coarse alignment of the multi-aperture objective, i.e. of the multi-aperture optics, in relation to the image sensor. This may include, for example, aligning the image sensor in relation to the test pattern, so that the test markers 38 are projected onto the corresponding image regions 22 of the image sensor. In addition, the multi-aperture optics may be arranged such that the markers continue to be projected onto the image regions. This may be supplemented, for example, by a step 1204, which follows step 1202, in that the multi-aperture optics are aligned in relation to the image sensor by performing an alignment in the x/y plane, or roll/pitch plane, until the text markers are imaged in the image regions. A step 1206 involves focusing the central optical channel.

A step 1208, which follows step 1206, involves determining the magnification in the central optical channel or for the inner image region. This may be effected, for example, by measuring the image size (actual size) of a test object, i.e. of the reference object. Since the optical properties of the multi-aperture optics as well as the distances between the reference object and the image regions are known, this may be performed on the basis of the optical laws. A decision 1212, which follows step 1208, involves verifying whether the determined magnification matches the selected design of the test pattern. If the decision 1212 is answered by "yes", the method switches to step 1214 by performing a fine alignment of the multi-aperture optics in relation to the image sensor, for example by means of one or more of the methods 800, 900, 1000, and/or 1100.

If the decision 1212 yields the result of "no", a step 1216 involves adapting the test pattern, and subsequently, the method switches to step 1214. Thus, it is possible to determine whether the test pattern is suitable for the respective image sensor and/or the multi-aperture optics. Adaptation of the test pattern may include, for example, changing one or more positions and/or shapes of the pattern, so that the test pattern can be projected into the image regions.

In other words, the process of actively aligning the multi-aperture optics in relation to the image sensor is performed by means of the evaluation of the relative and absolute positions of the images in the image matrix which are taken of the object structures by the individual optical channels.

For practical implementation, the optics module is initially coarsely aligned with the image sensor, and a focused image is set in the central optical channel. In the next step, the magnification m in the central optical channel is determined by measuring the image size of a test object B (object dimension in the image: B=number of pixels along the measured object edge*pixel pitch) in accordance with the known formula $$m = \frac{B}{G}.$$

The quantity G therein is the size of the object, i.e. the known extension of the test object in the object plane. Said quantity G is predefined, in accordance with the object distance (s), with the parameters of the multi-aperture objective that are known from the construction of the optics (e.g. the size of the range of vision of an optical channel). The calculated magnification results in the focal length (f), that is actually created by the manufacturing process, of the central optical channel in accordance with:

$$f = \frac{s}{\left(\frac{1}{m} - 1\right)}$$

In this form of the equation, the camera-to-subject distance (s) is to be inserted with a negative sign.

The real focal length (f) of the central channel may also be determined previously, however, by means of other methods (e.g. an auto collimation method, optical scanning, or contactless profile measurements, among others), or may already be known. In case the real focal length deviates from the focal length aimed at in the construction of the optics, a scaling of the geometric distribution of the average lines of vision within the object plane takes place during focusing of the multi-aperture objective. Thus, in this case, the placement of the object structures, which is a precondition for active alignment, has to be adapted (see FIG. 7). The new points of intersection of the average lines of vision of the optical channels with the object plane may be determined by changing the focal length to the real value from the design of the optics (e.g. Raytracing simulation software).

In other words, FIG. 12 shows a summarizing overview of the flow of the preparation of the fine alignment process. By means of the method 1200, the reference object is arranged such that the reference object is imaged to one image region per channel in the optical channels by the multi-aperture optics.

Figure 13:
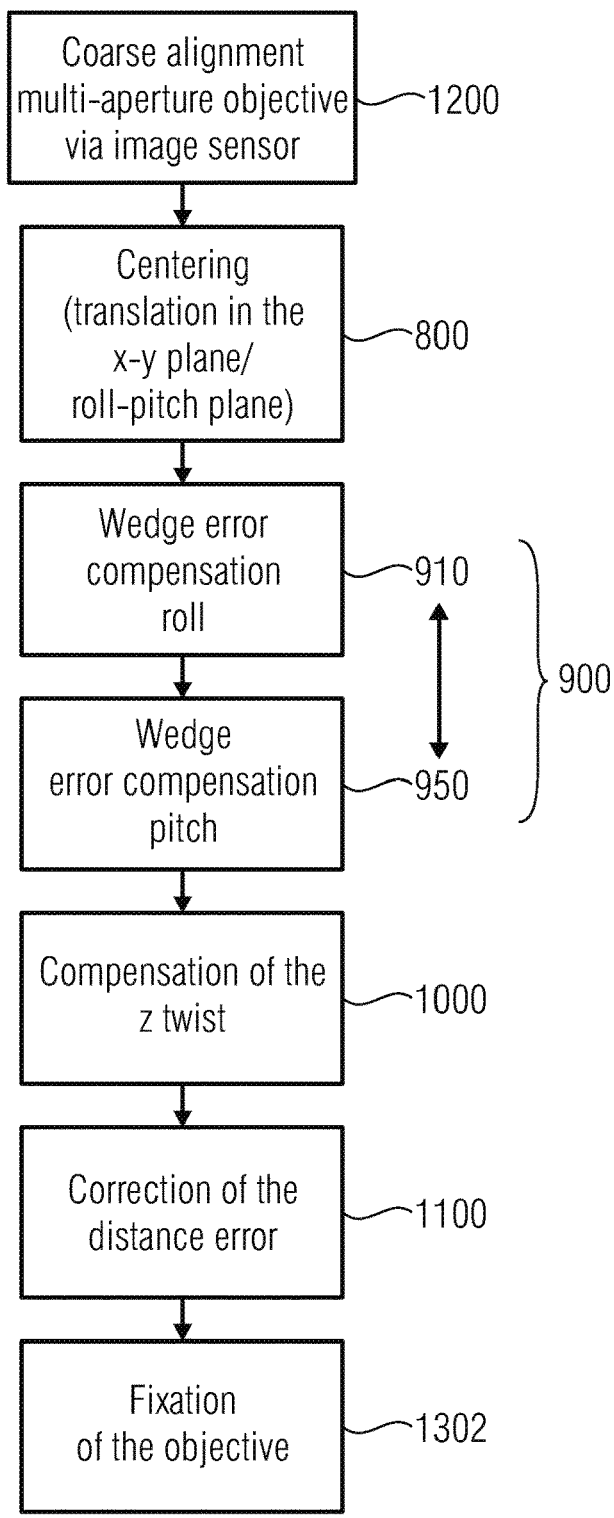
FIG. 13 shows a schematic flowchart of a method wherein high positioning accuracies may be advantageously achieved along the six degrees of freedom, in accordance with an embodiment.

FIG. 13 shows a schematic flowchart of a method 1300, wherein positioning inaccuracies along the six degrees of freedom are reduced or compensated for in an advantageous manner. A first step involves performing the method 1200 for coarse alignment of the multi-aperture optics in relation to the image sensor. Following the method 1200, the method 800 is performed, so that centering by means of a translation in the x-y plane is performed. Following the method 800, wedge error compensation is performed along the roll axis by performing the process stage 910. Following the process stage 910, the process stage 950 for compensating for the wedge error in relation to the pitch axis is performed. The process stages 910 and 950 may also be performed in a different sequence and jointly constitute the method 900. Following the method 900, the method 1000 for compensating for the z twist (or yaw twist) is performed. Following the method 1000, the method 1100 for correcting the distance error is performed. Following the method 1100, the objective may be fixated 1302. In other words, the multi-aperture objective may be fixated, following the overall process of fine alignment, in the aligned position, for example by means of an adhesive-bonded joint between the housing and the printed circuit board.

Alternatively, the method 1300 may be performed with a modified sequence of the individual partial methods. Alternatively or additionally, it is also possible to perform only one or more of the methods 800, 900, 1000, 1100, and/or 1200.

In other words, at the beginning of the assembly process, the previously assembled multi-aperture objective possibly exists in a manner in which it is integrated in an airtight housing, and separated from it, the image sensor that is already contacted on a printed circuit board and can be read out exists (see exemplary representation of FIG. 3). For the active alignment process, the image sensor is positioned such that the connecting line between the center of the image field (=geometric center of the pixel matrix) and the center of the object plane (=test pattern plane) is perpendicular to the image plane and thus corresponds to the normal on the image sensor. This is advantageously achieved by holding the image sensor, or the printed circuit board on which same is integrated, at least with a fairly good approximation. For performing the active alignment process, the following requirements placed upon the assembly device may exist. The assembly device advantageously includes a device for holding, in a manner aligned in relation to the test pattern, the image sensor on the printed circuit board inclusive of a readout interface; a device for holding the multi-aperture objective (e.g. gripper, mechanical, pneumatic, by means of vacuum, etc.); a device for changing the relative position of the objective in relation to the image sensor in six degrees of freedom (translation in the x, y, & z directions as well as twisting by x, y, and z axes), it being possible for a shared pivot point to be set, for the three rotational degrees of freedom, close to the center of the multi-aperture objective; a test pattern or screen of a pattern projection at a suitable distance (=object distance) from the multi-aperture objective, which is illuminated in a sufficiently homogenous manner; an image readout and image evaluation device comprising an interface for driving the actuators/motors for changing the relative location of the objective in relation to the image sensor (e.g. PC comprising evaluation and control software); and an algorithm for image segmentation, object recognition, and position determination of the imaged structures of the test pattern onto the image center by means of the multi-aperture optics.

Figure 14:
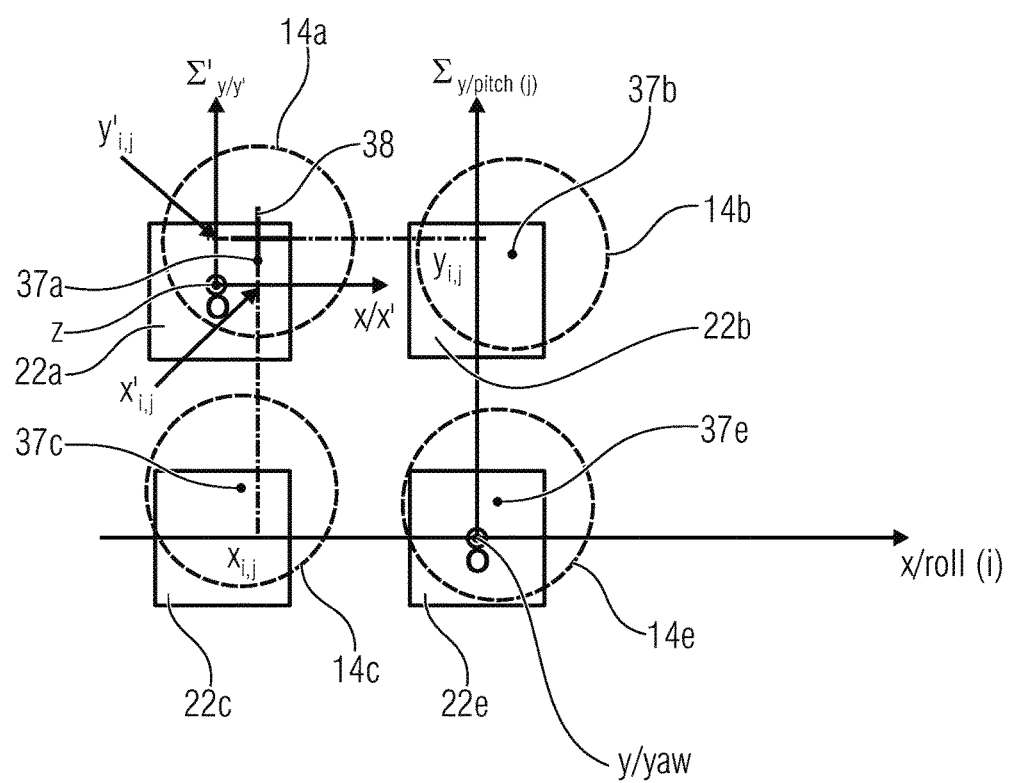
FIG. 14 shows a schematic diagram for illustrating the relationships between the global coordinate system and local coordinate systems by way of example for an image region in accordance with an embodiment.

FIG. 14 shows a schematic diagram for illustrating the relationships between the global coordinate system $\Sigma$ and local coordinate systems $\Sigma'$ by way of example for the image region 22a. As is described, for example, for FIGS. 3a and 3b, the global coordinate system $\Sigma$ comprises the point of intersection of the roll axis, the pitch axis, and the yaw axis, it being possible for the shared point of intersection to also be a shared pivot point of the movement in the six degrees of freedom initiated by the positioning device in relation to the multi-aperture optics. The optical channel 14e of the multi-aperture optics is arranged in relation to the image region 22e, the optical channel 14e comprising the optical center 37e.

The image regions 22a-c each comprise a local coordinate system $\Sigma'$ comprising an x axis, a y axis, and a z axis, the shared point of intersection of all of which is arranged at the geometric center of the image region 22a-c. The local coordinate systems $\Sigma'$ may be a Cartesian coordinate system, for example, wherein the x,y, and z axes intersect at the center at right angles in relation to one another. A position of the marker 38, which is projected into the image region 22a, may be indicated both by local coordinates $y'_{i,j}$ and/or $x'_{i,j}$ and by the global coordinates $y_{i,j}$ or $x_{i,j}$. The indices i,j may be indices, for example, which indicate a numbering of the image regions 22a-d along the roll axis and/or the pitch axis.

In other words, FIG. 14 shows a sketch for describing the coordinates in the image plane of the multi-aperture camera module in a top view. The global coordinate system in the image plane $\Sigma$ has its origin in the geometric center of the image field, while the local coordinate system $\Sigma'$ has its origin in the geometric center of the image field of the respective optical channel. What is shown is a case wherein the image circles of four adjacent optical channels (dashed circles comprising center markings) are aligned in a non-optimum manner with the image fields (squares) on the image sensor that are associated with each channel. The cross shown in the upper left optical channel represents the image of an object structure positioned at a correspondingly predefined location within the image plane, as is generated by the associated optical channel.

Figure 15:
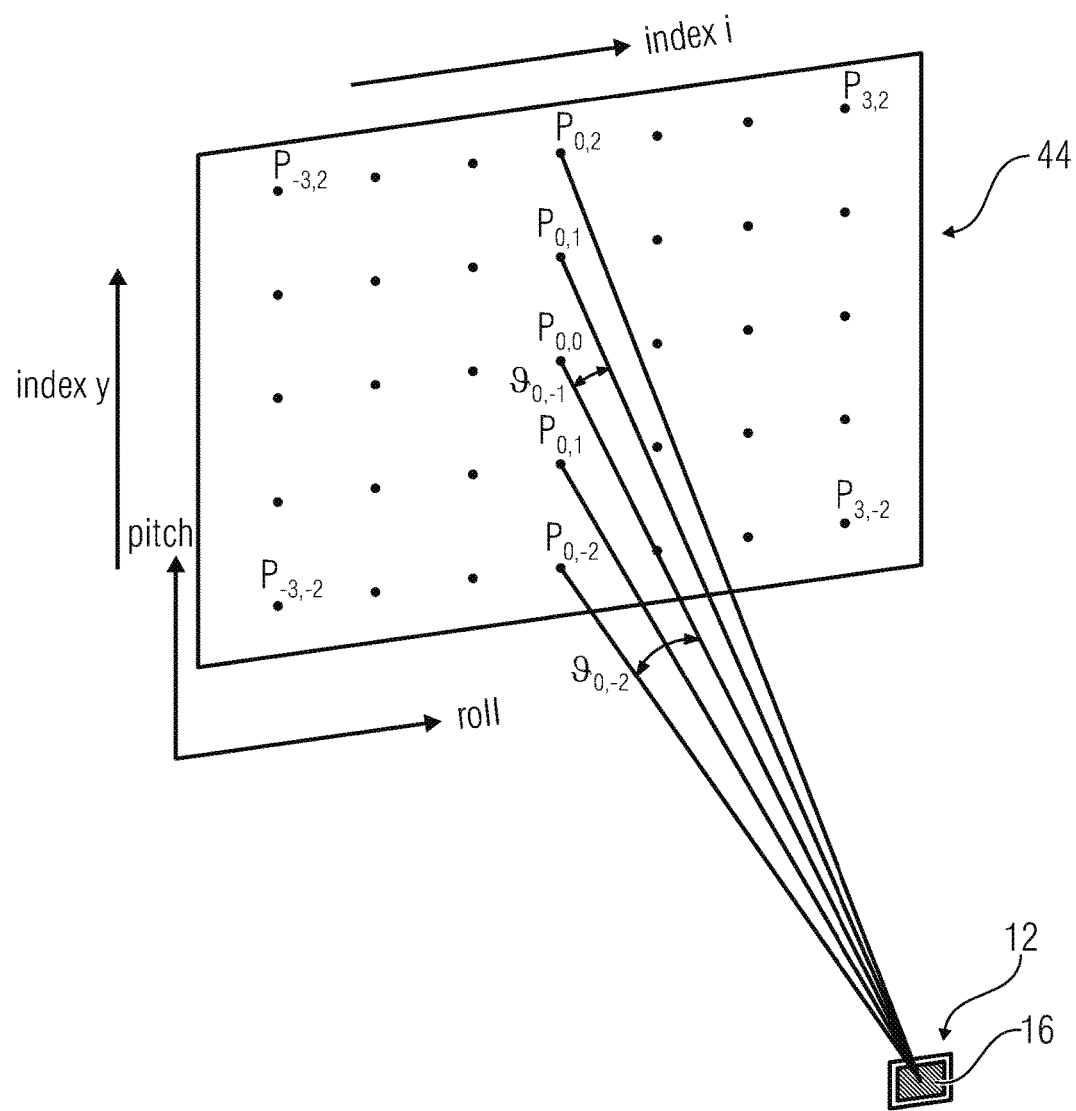
FIG. 15 shows a schematic representation of scanning in an object plane by a multi-aperture objective including the multi-aperture optics and the image sensor having a 2D arrangement of optical channels, in accordance with an embodiment.

FIG. 15 shows a schematic representation of the scanning in an object plane 44 by a multi-aperture objective including the multi-aperture optics 12 and the image sensor 16 comprising a 2-dimensional arrangement of optical channels. The points $P_{i,j}$ mark the point of intersection of the respective average line of vision of the respective optical channel (i,j), in an error-free case, with the object plane.

The object plane is depicted, for example, such that it is scanned with seven optical channels in the i direction and with five optical channels in the j direction, which means $i_{max}=3$, $-i_{max}=-3$, $j_{max}=2$, $-j_{max}=-2$. The markers 38 may be arranged at the locations $P_{-3,2}$, $P_{3,2}$, $P_{-3,-2}$, and $P_{3,-2}$. A marker 38 may also be arranged at the location $P_{0,0}$. Alternatively, the markers may also be arranged at a different position in the object region 44 and/or on the reference object, a described maximum distance between the markers being advantageous.

In other words, a two-dimensional arrangement of a multi-aperture objective consists of an array of optical channels with $(2*i_{max}+1)$ channels in x dimension, and $(2*j_{max}+1)$ channels in the y dimension. As can be seen in FIG. 15 and subsequent FIG. 16, each optical channel of the multi-aperture objective exhibits a different angle of view in the object space (as is also known from WO 2011/045324 A2), and/or the various optical channels image different regions of the object plane. This means that the points of intersection of the axes of the average line of vision of each optical channel (=respective optical axis) with the object plane yield a predefined distribution (known from the design) (subsequent FIG. 16). For example, a grid having equidistant distances is used in the event that imaging free from distortion is desired.

Specific object structures (e g. crosses, circles, squares, etc.) are placed in several (e.g. three or five) selected positions of said points of intersection with the object plane (e.g. in the points $P_{0,0}$, $P_{-imax,jmax}$ $P_{-imax,-jmax}$, $P_{imax,-jmax}$, $P_{imax,jmax}$) in the test pattern plane. The choice of the centers of the object structures here includes the center of the object plane (e.g. $P_{0,0}$), at least a pair of advantageously mirror-symmetrically positioned points or regions in relation to the roll axis (e.g. $P_{-imax,jmax}$ with $P_{-imax,-jmax}$ or $P_{imax,-jmax}$ with $P_{imax,jmax}$) and/or at least a pair of advantageously mirror-symmetrically positioned points or regions in relation to the pitch axis (e.g. $P_{-imax,jmax}$ with $P_{imax,jmax}$ or $P_{-imax,-jmax}$ with $P_{imax,-jmax}$).

The level of accuracy of the subsequently described individual steps of active alignment may be increased in direct proportion with the respective distance of the two selected points in the object plane.

In this context, the highest possible level of accuracy in the alignment is achieved by as large a distance as possible of the associated points. An angular deviation between the positions $P_{i,j}$ can be indicated by an angle $\vartheta_{i,j}$, for example by the angle $\vartheta_{0,1}$ for a deviation between the positions $P_{0,0}$ and $P_{0,1}$. Alternatively, for example, an angle $\vartheta_{0,-2}$ comprises a deviation and/or a difference in the angle of view of the respective optical channels between the positions $P_{0,0}$ and $P_{0,-2}$.

FIG. 16 shows a schematic lateral sectional view including the multi-aperture optics 12 and the image sensor 16 for illustrating the relationships of FIG. 15. The angle $\vartheta_{i,y}$ with $y=-2,\ldots,2$ comprise an angle with regard to a normal that is perpendicular to the plane 46, in relation to a plane that is arranged in parallel with the object space captured.

Angles $\alpha_{i,j}$ describe angles between a respective surface normal of the image sensor 16 at the image regions 22a-e.

In other words, FIG. 16 shows a simplified sectional view of a multi-aperture imaging system. In this embodiment, the multi-aperture objective (stack formation with microlenses at the front and rear sides) is integrated—such that it is connected, on the side of the image, to a plate for preventing optical cross talk (black chip)—in a housing (gray, lateral) which is fixated, in the process of active alignment, on the printed circuit board (green, below) on which the contacted digital image sensor (brown) is located. The mean line of vision of the respective optical channel (i,j) in the object space is designated by the angle $\vartheta_{i,j}$. The mean line of vision of the respective optical channel $\vartheta_{i,j}$ is specified by the construction of the optics and is due to the optical properties of the respectively associated lens system (focal length, refractive index of the materials, etc.), the angle of incidence at the center of respective microimage $\alpha_{i,j}$.

Figure 17A:
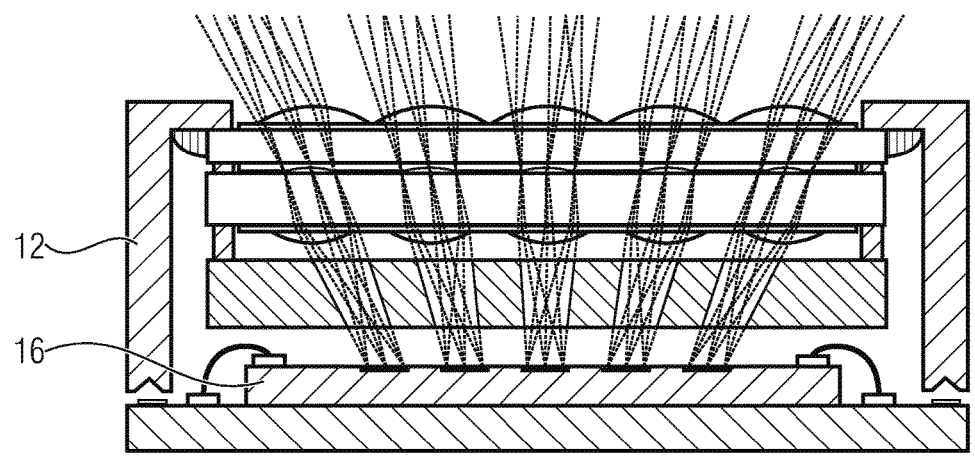
FIG. 17a shows a schematic lateral sectional view of multi-aperture optics that are adjusted in relation to the image sensor, in accordance with an embodiment.
Figure 17B:
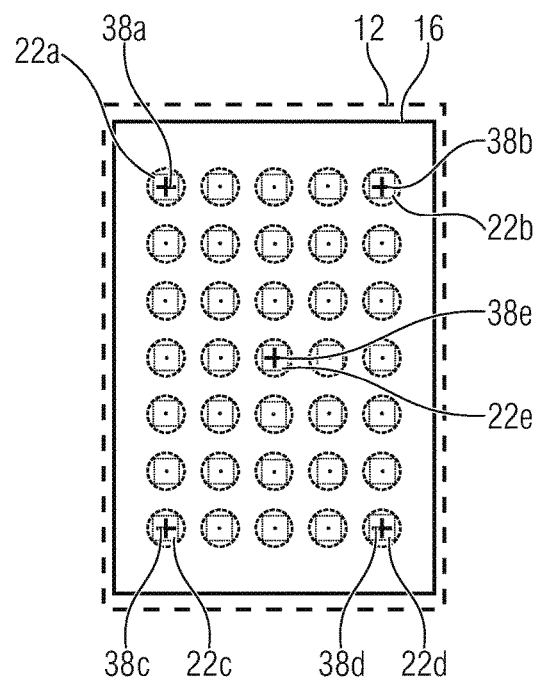
FIG. 17b shows a schematic top view of the situation of FIG. 17a in accordance with an embodiment.
Figure 18:
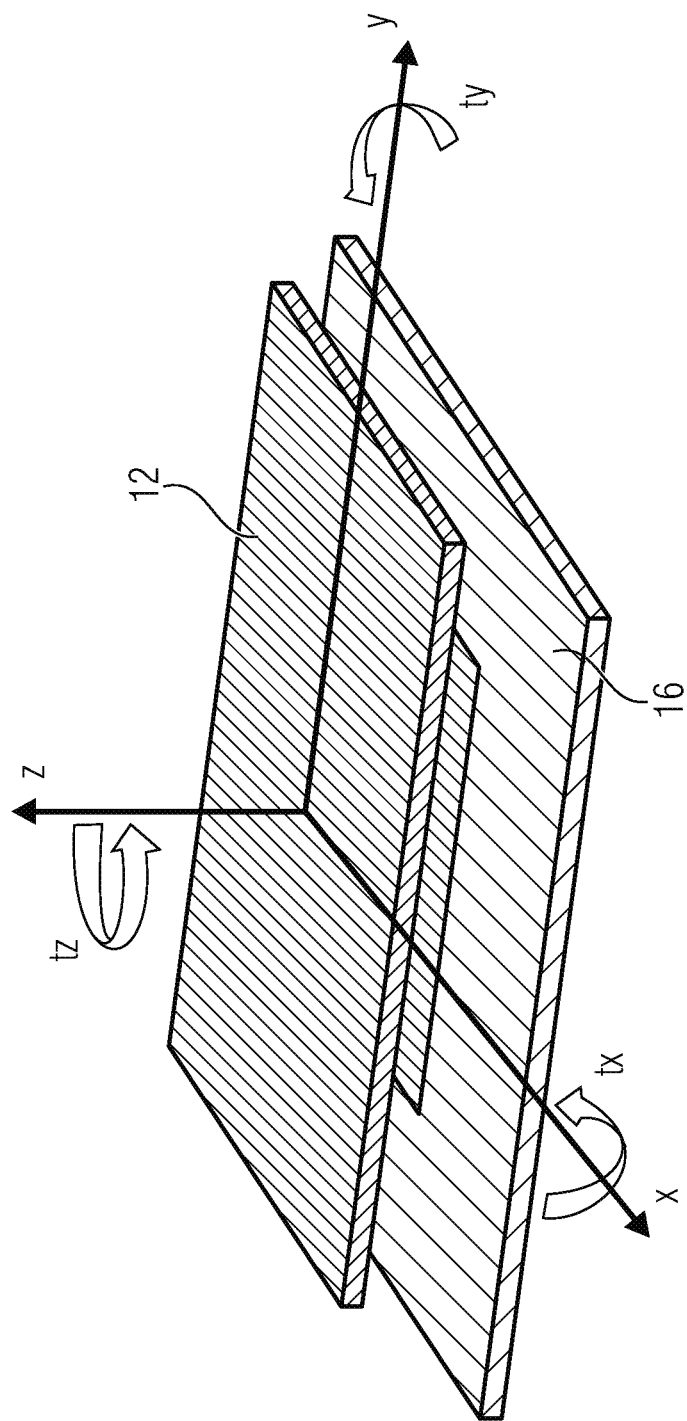
FIG. 18 shows a schematic image of an assembly layout of multi-aperture imaging optics to form an image sensor chip.
Figure 19:
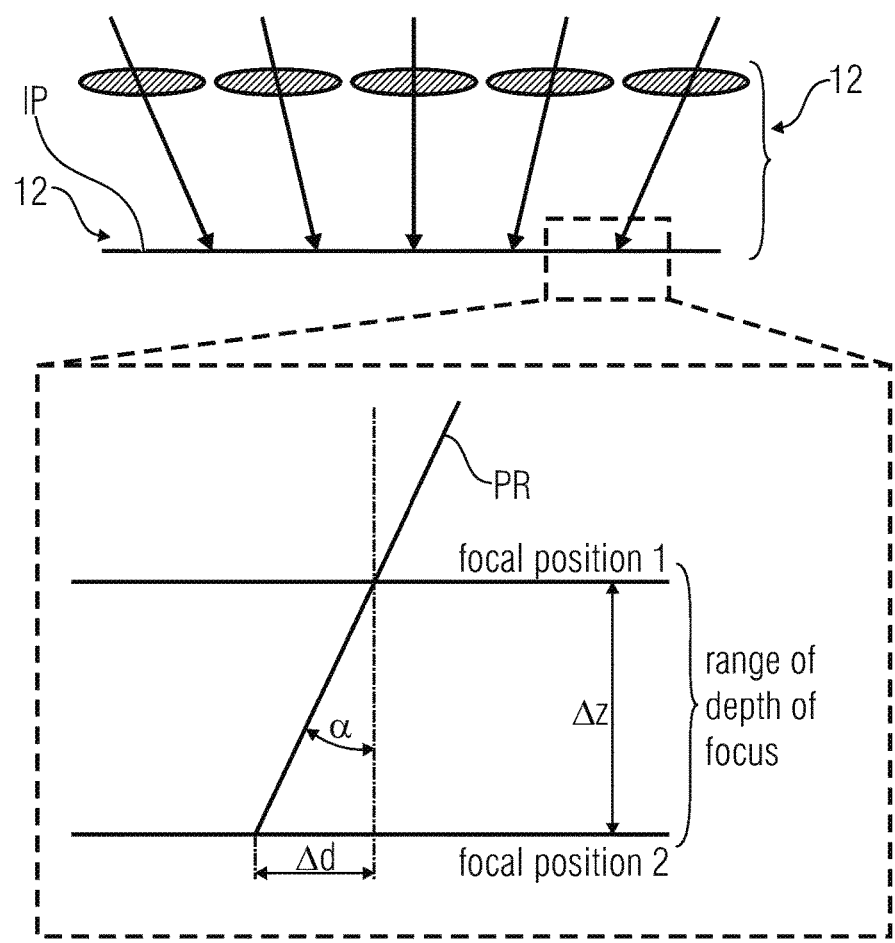
FIG. 19 shows a schematic lateral sectional view for illustrating the requirements regarding the alignment of multi-aperture optics with an image plane of the image sensor in accordance with conventional technology.

The above description of the process flow of the active alignment is represented, without any loss of generality, by means of FIG. 15 for an example of a multi-aperture objective comprising 7×5 optical channels and a cross as object structures at the intersection points of the mean line of vision of the optical channels in the four corners of the array ($P_{-3,d}$, $P_{-3,-2}$, $P_{3,-2}$, $P_{3,2}$) as well as of the central optical channel ($P_{0,0}$). FIGS. 17a and 17b show the target position following successive active alignment of the multi-aperture objective in relation to the image sensor.

FIG. 17a shows a schematic lateral sectional view of multi-aperture optics 12 that are aligned, i.e. adjusted, in relation to the image sensor 16. FIG. 17b shows a schematic top view of this situation of FIG. 17a. The markers 38a-e are aligned in relation to the respective image regions 22a-e with regard to the six degrees of freedom. A deviation of the locations to which the markers 38a-d are projected on the image regions 22a-e is minimal in relation to the respective local coordinate centers. In other words, FIGS. 17a and 17b show a target position following successful active alignment. The raster of microimages (dashed circles) is congruent with the raster of the pixel fields of the image sensor. (Squares) i.e. in each optical channel, the center of the associated image circle is located directly at the geometric center of the corresponding microimage field. The images of the selected object structures are located symmetrically at the geometric centers of the corresponding microimage fields. On the left: lateral view; on the right: top view.

The above-described embodiments enable an increased level of accuracy as compared to the application of established methods and machines for aligning imaging optics, in particular multi-aperture optics for devices of small design. Embodiments enable the possibility of automating the respective process of fine alignment in order to achieve fast cycle times in the production process. In addition, increased yield for the mounted camera modules and, thus, lower testing and reject costs can be obtained since fast alignment can be achieved at high quality.

This means that embodiments for active alignment can be configured specifically for the architecture of multi-aperture objectives having segmented ranges of vision and thus enable the above advantages. Due to their ultra-flat design and the potentially low-cost production and assembly technology, multi-aperture imaging systems are cut out for being used in products of consumer electronics (e.g. laptops, game consoles or toys), and specifically for being used in portable devices such as mobile telephones, tablets, PDA and the like, for example (PDA=personal digital assistant). Further fields of application are sensor technology, for example in camera-type sensors, imaging sensors in production technology, for example. Moreover, utilization in automotive technology, e.g. in optical safety sensors in the interiors of automobiles, in driving-assistance systems, such as reversing cameras or for lane detection, for example, is feasible. Embodiments can also be employed in the fields of security and surveillance, for example for inconspicuous surroundings cameras with large ranges of vision at and/or inside buildings, museums, or objects. In addition, embodiments may be employed in the field of robotics, for example as optical sensors for navigation, for optically controlling grippers and/or component pick-up devices. A further field of application of the above-described embodiments may be found in the field of medical technology, for example in using imaging diagnostic processes such as in endoscopy. However, application of the above described embodiments is not limited to said fields of application.

Even though the above described embodiments describe multi-aperture optics and/or image sensors comprising a small number of optical channels, for example 5×7, said embodiments may also be applied to other multi-aperture optics and/or image sensors comprising, e.g., more than 5, more than 50, or more than 500 optical channels.

Even though the above-described embodiments were described such that it is in relation to a local or global center of an image region that a calculating device performs a comparison of the positions at which the patterns are imaged into the image regions, a reference point in relation to which the shift or twist is determined may also be effected in relation to any other point.

Even though a two-dimensional arrangement of the image regions 22a-e was described in connection with the above-described embodiments, it is also feasible for the image regions 22a-e to be arranged along a one-directional line structure. This means that one of the two indices i or j is figured to be one-dimensional and that position determination may be effected on the basis of three reference regions, or image regions.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] www.aeiboston.com/platform_cmat.htm, May 2014

The invention claimed is:

1. Device for relative positioning of multi-aperture optics comprising several optical channels in relation to an image sensor, comprising:
    a reference object arranged such that the reference object is imaged to an image region per channel by the multi-aperture optics in the optical channels;
    a positioning device controllable to change a relative location between the multi-aperture optics and the image sensor;
    a calculating device configured to determine actual positions of the reference object in at least three image regions in images of the reference object and to control the positioning device on the basis of a comparison of the actual positions with positions; wherein the device is configured to at least one of:
    the calculating device being configured to control a fixation device, the fixation device being configured to harden a glue arranged between the multi-aperture optics and the image sensor or between the multi-aperture optics and a printed circuit board on which the image sensor is arranged;
    the reference object comprising at least three reference regions comprising a reference marking, so that one reference marking is imaged onto one of the at least three image regions, respectively, the calculating device being configured to determine the actual position on the basis of a position of the reference markings in the image region; and
    the calculating device being configured to
    determine a measure of a distance of pattern distances of the actual position for an inner image region on the basis of the pattern deviation, the calculating device being configured to control the positioning device such that same shifts the multi-aperture optics along the yaw axis, so that the distance reaches a target distance value;
    determine a measure of a first lateral difference of the actual position for the inner image region on the basis of the pattern deviation along a roll axis so as to determine a measure of a second lateral difference for the inner image region on the basis of the pattern deviation along a pitch axis and to control the positioning device such that the first lateral difference reaches a first lateral difference target value and that the second lateral difference reaches a second lateral difference target value;
    determine a measure of wedge error differences of pattern distances of the actual position for four outer image regions arranged in two opposing pairs in parallel with the roll axis and in two opposing pairs in parallel with the pitch axis, and to control the positioning device such that the multi-aperture optics are tilted in relation to the roll axis or the pitch axis, so that the wedge error differences reach a target roll value or a target pitch value;
    determine a measure of a rotational difference of the pattern deviation for the four outer image regions along a first local and a second local lateral direction, respectively, and to control the positioning device such that same rotates the multi-aperture optics about a yaw axis, so that the rotational differences reach a target rotational value; and
    determine a measure of a difference in distances of the pattern deviation for each of the outer image regions along a local direction in parallel with the roll axis and along a local direction in parallel with the pitch axis, and to control the positioning device such that same shifts the multi-aperture optics along the yaw axis, so that the differences in distance reach a target value.

2. Device as claimed in claim 1, wherein the calculating device is configured to control the positioning device on the basis of a comparison of the actual position of an image region in relation to actual positions in other image regions.

3. Device as claimed in claim 1, wherein the calculating device is configured to control the positioning device on the basis of a comparison of the actual position of an image region with a target position in relation to the image region.

4. Device as claimed in claim 1, wherein at least four outer image regions and one inner image region are arranged along a roll axis and a pitch axis, the outer image regions being arranged in two opposing pairs in parallel with the roll axis and in two opposing pairs in parallel with the pitch axis, the roll axis and the pitch axis being arranged to be perpendicular to each other and to be perpendicular to a yaw axis arranged in parallel with a surface normal of the image sensor, and the inner image region comprising an intersection point of the roll axis, the pitch axis, and the yaw axis, and wherein the calculating device is configured to determine, on the basis of the comparison of the actual positions with the position, a pattern deviation of a pattern in the inner image region and in the at least four outer image regions.

5. Device as claimed in claim 4, wherein the calculating device is configured to determine a measure of a distance of pattern distances of the actual position for the inner image region on the basis of the pattern deviation, the calculating device being configured to control the positioning device such that same shifts the multi-aperture optics along the yaw axis, so that the distance reaches a target distance value.

6. Device as claimed in claim 4, wherein the calculating device is configured to determine a measure of a first lateral difference of the actual position for the inner image region on the basis of the pattern deviation along the roll axis so as to determine a measure of a second lateral difference for the inner image region on the basis of the pattern deviation along the pitch axis and to control the positioning device such that the first lateral difference reaches a first lateral difference target value and that the second lateral difference reaches a second lateral difference target value.

7. Device as claimed in claim 4, wherein the calculating device is configured to determine a measure of wedge error differences of pattern distances of the actual position for each of the four outer image regions and to control the positioning device such that the multi-aperture optics are tilted in relation to the roll axis or the pitch axis, so that the wedge error differences reach a target roll value or a target pitch value.

8. Device as claimed in claim 4, wherein the calculating device is configured to control the positioning device such that the target roll value and the target pitch value are reached sequentially one after the other.

9. Device as claimed in claim 4, wherein the calculating device is configured to determine a measure of a rotational difference of the pattern deviation for each of the outer image regions along a first local and a second local lateral direction, respectively, and to control the positioning device such that same rotates the multi-aperture optics about the yaw axis, so that the rotational difference reaches a target rotational value.

10. Device as claimed in claim 4, wherein the calculating device is configured to determine a measure of a difference in distances of the pattern deviation for each of the outer image regions along a local direction in parallel with the roll axis and along a local direction in parallel with the pitch axis, and to control the positioning device such that same shifts the multi-aperture optics along the yaw axis, so that the differences in distance reach a target value.

11. Device as claimed in claim 1, wherein the calculating device is configured to control the positioning device in each case such that the distance reaches a target distance value, that the first lateral difference reaches a first lateral difference target value, and that the second lateral difference reaches a second lateral difference target value, before the calculating device controls the positioning device such that the wedge error differences reach the target roll value or the target pitch value, before the rotational differences reach the target rotational value, or before the differences in distance reach the target value.

12. Method of relative positioning of multi-aperture optics comprising several optical channels in relation to an image sensor, comprising:
   arranging a reference object such that the reference object is imaged to an image region per channel by the multi-aperture optics in the optical channels;
   providing a positioning device controllable to change a relative location between the multi-aperture optics and the image sensor;
   determining actual positions of the reference object in at least three image regions in images of the reference object;
   comparing the actual positions with positions; and
   controlling a positioning device on the basis of said comparison;
   and at least one of
   controlling a fixation device, the fixation device being configured to harden a glue arranged between the multi-aperture optics and the image sensor or between the multi-aperture optics and a printed circuit board on which the image sensor is arranged; or
   wherein the reference object comprises at least three reference regions comprising a reference marking, so that one reference marking is imaged onto one of the at least three image regions, respectively, the method comprising determining the actual position on the basis of a position of the reference markings in the image region; and a combination of
   determining a measure of a distance of pattern distances of the actual position for an inner image region on the basis of the pattern deviation and controlling the positioning device such that same shifts the multi-aperture optics along the yaw axis, so that the distance reaches a target distance value;
   determining a measure of a first lateral difference of the actual position for the inner image region on the basis of the pattern deviation along a roll axis so as to determine a measure of a second lateral difference for the inner image region on the basis of the pattern deviation along a pitch axis and controlling the positioning device such that the first lateral difference reaches a first lateral difference target value and that the second lateral difference reaches a second lateral difference target value;
   determining a measure of wedge error differences of pattern distances of the actual position for four outer image regions arranged in two opposing pairs in parallel with the roll axis and in two opposing pairs in parallel with the pitch axis, and controlling the positioning device such that the multi-aperture optics are tilted in relation to the roll axis or the pitch axis, so that the wedge error differences reach a target roll value or a target pitch value;
   determining a measure of a rotational difference of the pattern deviation for the four outer image regions along a first local and a second local lateral direction, respectively, and controlling the positioning device such that same rotates the multi-aperture optics about a yaw axis, so that the rotational differences reach a target rotational value; and
   determining a measure of a difference in distances of the pattern deviation for each of the outer image regions along a local direction in parallel with the roll axis and along a local direction in parallel with the pitch axis, and controlling the positioning device such that same shifts the multi-aperture optics along the yaw axis, so that the differences in distance reach a target value.

* * * * *